United States Patent
Yumura et al.

(10) Patent No.: US 10,064,153 B2
(45) Date of Patent: Aug. 28, 2018

(54) POSITION ESTIMATION APPARATUS, POSITION ESTIMATION METHOD, TARGET TERMINAL, COMMUNICATION METHOD, COMMUNICATION TERMINAL, RECORDING MEDIUM, AND POSITION ESTIMATION SYSTEM

(71) Applicant: SONY CORPORATION, Tokyo (JP)

(72) Inventors: Tsubasa Yumura, Tokyo (JP); Atsushi Shionozaki, Tokyo (JP)

(73) Assignee: SONY CORPORATION, Tokyo (JP)

(*) Notice: Subject to any disclaimer, the term of this patent is extended or adjusted under 35 U.S.C. 154(b) by 213 days.

(21) Appl. No.: 14/778,274

(22) PCT Filed: Dec. 10, 2013

(86) PCT No.: PCT/JP2013/083132
§ 371 (c)(1),
(2) Date: Sep. 18, 2015

(87) PCT Pub. No.: WO2014/155851
PCT Pub. Date: Oct. 2, 2014

(65) Prior Publication Data
US 2016/0295546 A1    Oct. 6, 2016

(30) Foreign Application Priority Data

Mar. 29, 2013    (JP) ................. 2013-071906

(51) Int. Cl.
*H04W 64/00*    (2009.01)
*H04M 3/42*    (2006.01)
(Continued)

(52) U.S. Cl.
CPC ........ *H04W 64/00* (2013.01); *H04L 61/6022* (2013.01); *H04M 3/42008* (2013.01);
(Continued)

(58) Field of Classification Search
CPC ....... H04W 64/00; H04W 4/02; H04W 4/025; H04W 64/003; H04W 4/023; H04W 4/008; H04M 3/42008
(Continued)

(56) References Cited

U.S. PATENT DOCUMENTS 9,661,496 B2 *    5/2017    Takeuchi ............... G06F 13/00
2005/0032529 A1 *    2/2005    Akama .................. H04W 8/08
                                                                455/456.2
(Continued)

FOREIGN PATENT DOCUMENTS

JP    2005-027108 A    1/2005
JP    2008-104029 A    5/2008
(Continued)

*Primary Examiner* — Jaime Holliday
(74) *Attorney, Agent, or Firm* — Oblon, McClelland, Maier & Neustadt, L.L.P.

(57) ABSTRACT

There is provided a position estimation apparatus including: an identification information provision unit which provides temporarily issued prescribed identification information to a target terminal; a data acquisition unit which acquires transmission data transmitted from a communication terminal receiving a wireless signal; and a position estimation unit which estimates a position of the target terminal, in the case where identification information included in the transmission data is the prescribed identification information notified to the communication terminal from the target terminal by the wireless signal, based on position information of the communication terminal.

19 Claims, 16 Drawing Sheets

(51) Int. Cl.
*H04W 4/02* (2018.01)
*H04W 84/12* (2009.01)
*H04L 29/12* (2006.01)

(52) U.S. Cl.
CPC .............. *H04W 4/02* (2013.01); *H04W 4/023* (2013.01); *H04W 4/025* (2013.01); *H04W 64/003* (2013.01); *H04W 84/12* (2013.01)

(58) Field of Classification Search
USPC ................. 455/456.1, 456.2, 456.6, 41.2
See application file for complete search history.

(56) References Cited

U.S. PATENT DOCUMENTS

| | | | | |
|---|---|---|---|---|
| 2006/0267841 | A1* | 11/2006 | Lee | G01S 5/0081 342/463 |
| 2010/0303047 | A1* | 12/2010 | Ibrahim | H04W 4/001 370/338 |
| 2012/0244884 | A1* | 9/2012 | Lim | H04W 4/023 455/456.2 |
| 2013/0247117 | A1* | 9/2013 | Yamada | G08C 17/02 725/93 |
| 2015/0005002 | A1* | 1/2015 | Boulay | G01S 5/0072 455/456.1 |

FOREIGN PATENT DOCUMENTS

| | | |
|---|---|---|
| WO | 03/079701 A1 | 9/2003 |
| WO | 2005/079003 A1 | 8/2005 |

* cited by examiner

POSITION ESTIMATION APPARATUS, POSITION ESTIMATION METHOD, TARGET TERMINAL, COMMUNICATION METHOD, COMMUNICATION TERMINAL, RECORDING MEDIUM, AND POSITION ESTIMATION SYSTEM

TECHNICAL FIELD

The present disclosure relates to a position estimation apparatus, a position estimation method, a target terminal, a communication method, a communication terminal, a recording medium, and a position estimation system.

BACKGROUND ART

In recent years, technology has been disclosed which estimates a position of a target terminal, in the case where the target terminal has received a wireless signal transmitted from a base station, based on position information of this base station (for example, refer to Patent Literature 1). In such technology, when a Media Access Control (MAC) address of the base station included in a wireless signal received by the target terminal is transmitted to a position estimation apparatus, the position estimation apparatus specifies position information of the base station from the MAC address of the base station, and estimates a position of the target terminal based on the position information of the base station.

However, according to the type of Operating System (OS) executed in the target terminal, there will be cases where the MAC address of the base station is not able to be acquired from a wireless signal by an application started on this OS.

On the other hand, technology exists which estimates a position of a target terminal, in the case where a base station of the surroundings of the target terminal has received a wireless signal transmitted from the target terminal, based on position information of this base station of the surroundings. In such technology, when the target terminal sends a wireless signal including its own MAC address to the surroundings, this MAC address of the target terminal is transmitted to a position estimation apparatus from the base station of the surroundings receiving the MAC address of the target terminal. The position estimation apparatus estimates a position of the target terminal, based on position information of this base station of the surroundings transmitting the MAC address of the target terminal.

CITATION LIST

Patent Literature

Patent Literature 1: JP 2008-104029A

SUMMARY OF INVENTION

Technical Problem

However, if a wireless signal including the MAC address of a target terminal is sent to the surroundings, there is the possibility that information related to a user of the target terminal is acquired by another person, and there is the possibility that it may lead to an infringement of the user's privacy. Therefore, it is desirable for technology to be implemented capable of reducing the possibility that information related to a user of a target terminal is acquired by another person, when estimating a position of the target terminal.

Solution to Problem

According to the present disclosure, there is provided a position estimation apparatus including: an identification information provision unit which provides temporarily issued prescribed identification information to a target terminal; a data acquisition unit which acquires transmission data transmitted from a communication terminal receiving a wireless signal; and a position estimation unit which estimates a position of the target terminal, in the case where identification information included in the transmission data is the prescribed identification information notified to the communication terminal from the target terminal by the wireless signal, based on position information of the communication terminal.

According to the present disclosure, there is provided a position estimation method including: providing temporarily issued prescribed identification information to a target terminal; acquiring transmission data transmitted from a communication terminal receiving a wireless signal; and estimating a position of the target terminal, in the case where identification information included in the transmission data is the prescribed identification information notified to the communication terminal from the target terminal by the wireless signal, based on position information of the communication terminal.

According to the present disclosure, there is provided a computer-readable recording medium having a program recorded thereon, the program for causing a computer to function as a position estimation apparatus including: an identification information provision unit which provides temporarily issued prescribed identification information to a target terminal; a data acquisition unit which acquires transmission data transmitted from a communication terminal receiving a wireless signal; and a position estimation unit which estimates a position of the target terminal, in the case where identification information included in the transmission data is the prescribed identification information notified to the communication terminal from the target terminal by the wireless signal, based on position information of the communication terminal.

According to the present disclosure, there is provided a target terminal capable of communicating with a position estimation apparatus which performs a position estimation of a target terminal by receiving transmission data including temporarily issued prescribed identification information from a communication terminal, the target terminal including: an identification information acquisition unit which acquires temporarily issued prescribed identification information from a position estimation apparatus; and a transmission control unit which performs a control in a manner that the prescribed identification information is notified to a communication terminal by a wireless signal.

According to the present disclosure, there is provided a communication method of a target terminal capable of communicating with a position estimation apparatus which performs a position estimation of a target terminal by receiving transmission data including temporarily issued prescribed identification information from a communication terminal, the communication method including: acquiring temporarily issued prescribed identification information from a position estimation apparatus; and performing a control in a manner that the prescribed identification information is notified to a communication terminal by a wireless signal.

According to the present disclosure, there is provided a computer-readable recording medium having a program recorded thereon, the program for causing a computer to function as a target terminal capable of communicating with a position estimation apparatus which performs a position estimation of a target terminal by receiving transmission data including temporarily issued prescribed identification information from a communication terminal, the target terminal including: an identification information acquisition unit which acquires temporarily issued prescribed identification information from a position estimation apparatus; and a transmission control unit which performs a control in a manner that the prescribed identification information is notified to a communication terminal by a wireless signal.

According to the present disclosure, there is provided a communication terminal including: a reception control unit which performs a control in a manner that a wireless signal is received; and a transmission control unit which performs a control, in the case where temporarily issued prescribed identification information has been notified from a target terminal by the wireless signal, in a manner that transmission data including the prescribed identification information as identification information is transmitted to a position estimation apparatus.

According to the present disclosure, there is provided a communication method including: performing a control in a manner that a wireless signal is received; and performing a control, in the case where temporarily issued prescribed identification information has been notified from a target terminal by the wireless signal, in a manner that transmission data including the prescribed identification information is transmitted to a position estimation apparatus.

According to the present disclosure, there is provided a computer-readable recording medium having a program recorded thereon, the program for causing a computer to function as a communication terminal including: a reception control unit which performs a control in a manner that a wireless signal is received; and a transmission control unit which performs a control, in the case where temporarily issued prescribed identification information has been notified from a target terminal by the wireless signal, in a manner that transmission data including the prescribed identification information is transmitted to a position estimation apparatus.

According to the present disclosure, there is provided a position estimation system including: a position estimation apparatus; a target terminal; and a communication terminal. The position estimation apparatus has an identification information provision unit which provides temporarily issued prescribed identification information to a target terminal, a data acquisition unit which acquires transmission data transmitted from a communication terminal receiving a wireless signal, and a position estimation unit which estimates a position of the target terminal, in the case where identification information included in the transmission data is the prescribed identification information notified to the communication terminal from the target terminal by the wireless signal, based on position information of the communication terminal. The target terminal has an identification information acquisition unit which acquires the prescribed identification information from the position estimation apparatus, and a transmission control unit which performs a control in a manner that the prescribed identification information is notified to the communication terminal by the wireless signal. The communication terminal has a reception control unit which performs a control in a manner that the wireless signal is received, and a transmission control unit which performs a control, in the case where the prescribed identification information has been notified from the target terminal by the wireless signal, in a manner that transmission data including the prescribed identification information as identification information is transmitted to the position estimation apparatus.

Advantageous Effects of Invention

According to the present disclosure such as described above, it is possible to reduce the possibility that information related to a user of a target terminal is acquired by another person, when estimating a position of the target terminal.

DESCRIPTION OF EMBODIMENTS

Figure 1:
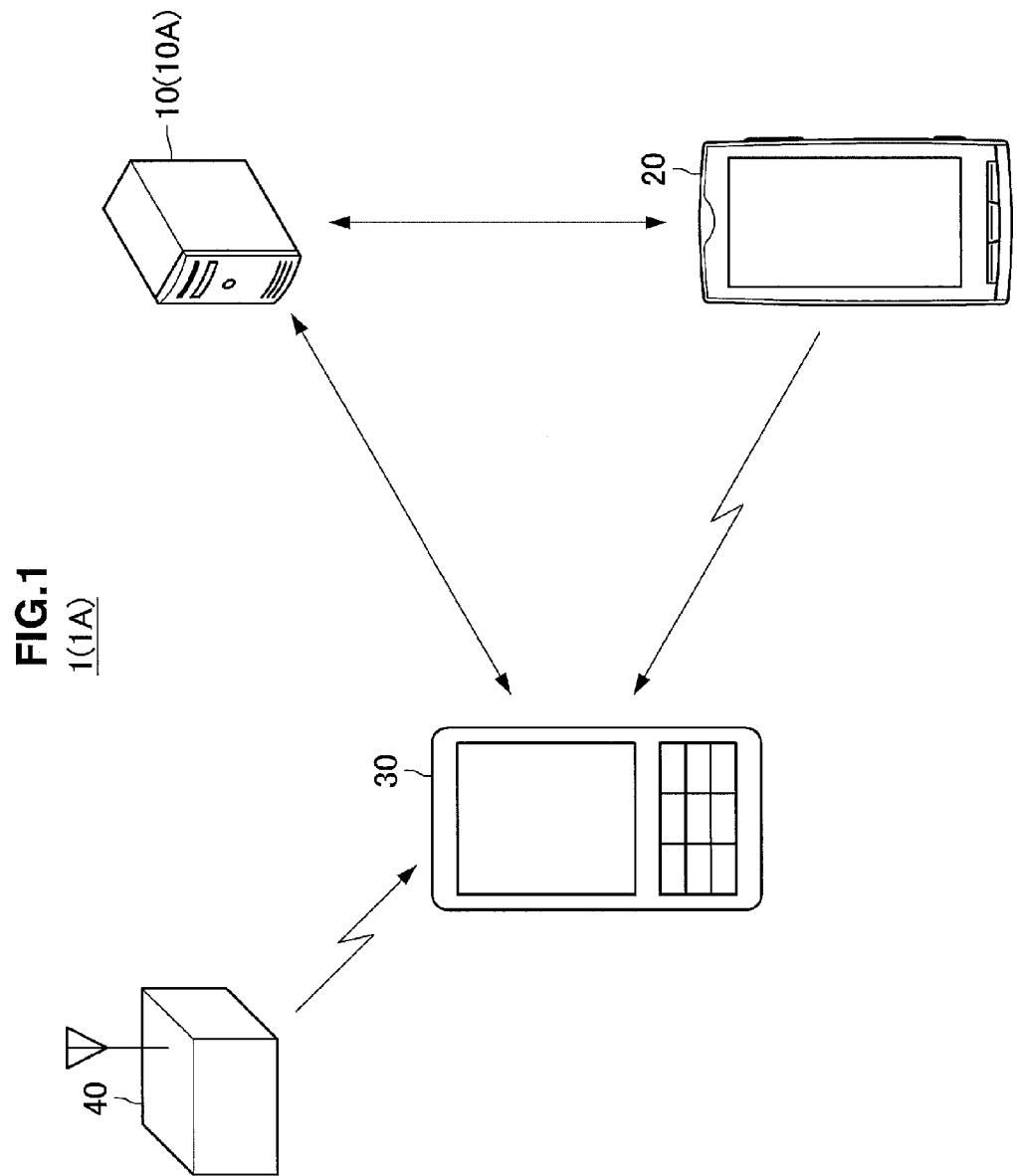
FIG. 1 is a figure which shows a configuration example of a position estimation system according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Further, this "mode for carrying out the invention" will be described in accordance with the item order shown below.
1. First Embodiment
  1.1. Configuration example of the position estimation system
  1-2. Function configuration example of the position estimation apparatus
  1.3. Operation example of the position estimation apparatus
  1.4. Function configuration example of the target terminal
  1.5. Operation example of the target terminal
  1.6. Function configuration example of the communication terminal
  1.7. Operation example of the communication terminal
  1.8. Operation example of the position estimation system
2. Second Embodiment
  2-1. Configuration example of the position estimation system
  2-2. Function configuration example of the position estimation apparatus
  2-3. Operation example of the position estimation apparatus
  2-4. Operation example of the position estimation system
3. Hardware configuration examples
4. Conclusion

1. First Embodiment

First, a first embodiment of the present disclosure will be described.

[1.1. Configuration Example of the Position Estimation System]

First, a configuration example of a position estimation system 1A according to the first embodiment of the present disclosure will be described. FIG. 1 is a figure which shows a configuration example of the position estimation system 1A according to the first embodiment of the present disclosure. As shown in FIG. 1, the position estimation system 1A includes a position estimation apparatus 10A, a target terminal 20, and a communication terminal 30.

It is possible for the position estimation apparatus 10A to perform an information process according to a request from the target terminal 20, and to respond with a processing result to the target terminal 20. Similarly, it is possible for the position estimation apparatus 10A to perform an information process according to a request from the communication terminal 30, and to respond with a processing result to the communication terminal 30. Note that, in the example shown in FIG. 1, while all of the functions of the position estimation apparatus 10A are integrated, a part of the functions of the position estimation apparatus 10A (for example, an identification information provision unit 111) may be constituted in a separate body to the other sections.

The target terminal 20 is a terminal operated by a user. In the following description, while the case where the target terminal 20 is applied to a smartphone will be described as an example, the target terminal 20 may be applied to an apparatus other than a smartphone. For example, the target terminal 20 may be applied to a video camera, a digital camera, a Personal Digital Assistant (PDA), a Personal Computer (PC), a mobile phone, a portable music playback apparatus, a portable video processing apparatus, a portable game machine or the like.

The communication terminal 30 is a terminal which exists in the surroundings of the target terminal 20. In the example shown in FIG. 1, while the position estimation system 1A has one communication terminal 30, the position estimation system 1A may have a plurality of communication terminals 30. In the following description, while the case where the communication terminal 30 is applied to a mobile phone will be described as an example, the target terminal 20 may be applied to an apparatus other than a mobile phone. For example, the target terminal 20 may be applied to a video camera, a digital camera, a smartphone, a PDA, a PC, a portable music playback apparatus, a portable video processing apparatus, a portable game machine or the like. Further, in the example shown in FIG. 1, while the communication terminal 30 is a moving-type terminal, it may be a fixed-type terminal.

The base station 40 relays communication with the communication apparatus. For example, the base station 40 can relay wireless communication by the target terminal 20 or the communication terminal 30 within an electrical wave arrival range, or can relay communication between the target terminal 20 or the communication terminal 30 and a communication apparatus connected by wires to the base station 40. Specifically, the base station 40 may be a base station of a wireless Local Area Network (LAN). Note that, in the example shown in FIG. 1, while the position estimation system 1A has one base station 40, it may have a plurality of base stations 40, or may not include the base station 40.

Further, the base station 40 can periodically transmit a beacon signal for notifying the existence of the base station 40 to the surroundings. An identifier of the base station uniquely given to the base station 40, for example, is included in the beacon signal. As a result of this, the communication terminal 30 can confirm the existence of the base station 40 existing in the surroundings, based on the identifier of the base station transmitting the beacon signal received by itself. Similarly, the target terminal 20 can confirm the existence of the base station 40 existing in the surroundings, based on the identifier of the base station transmitting the beacon signal received by itself. The identifier of the base station 40 is, for example, a Media Access Control (MAC) Address of the Base Station 40.

Here, technology also exists in which the position estimation apparatus 10A estimates a position of the target terminal 20, in the case where the base station 40 of the surroundings of the target terminal 20 has received a wireless signal transmitted from the target terminal 20, based on position information of this base station 40 of the surroundings. However, if a wireless signal including a MAC address of the target terminal 20 is sent to the surroundings, there is the possibility that information related to a user of the target terminal 20 is acquired by another person, and there is the possibility that it may lead to an infringement of the user's privacy.

Accordingly, the present disclosure proposes technology capable of reducing the possibility that information related to a user of the target terminal 20 is acquired by another person, when estimating a position of a target terminal 20 by the position estimation apparatus 10A.

[1-2. Function Configuration Example of the Position Estimation Apparatus]

Figure 2:
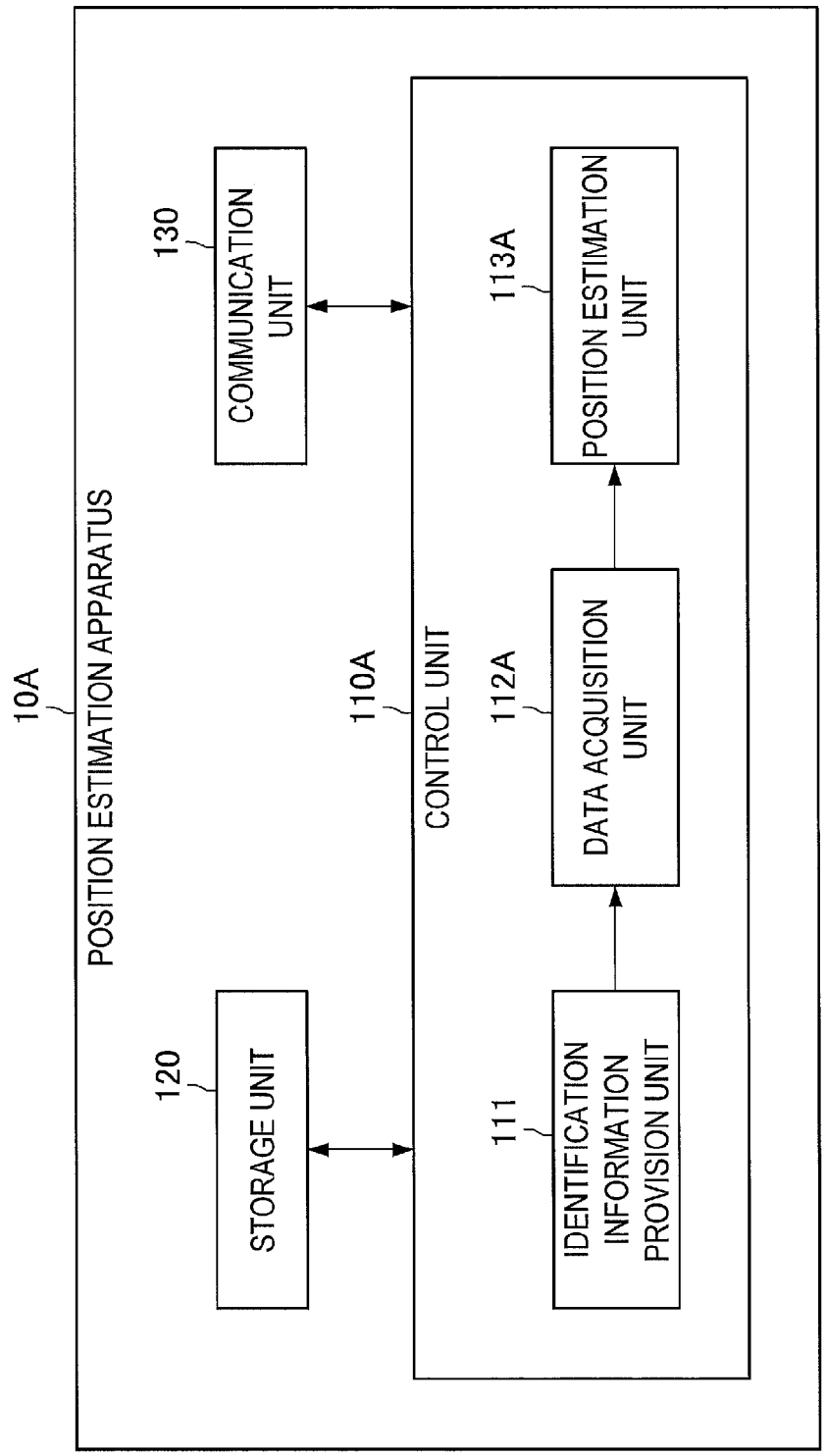
FIG. 2 is a figure which shows a function configuration example of a position estimation apparatus according to the first embodiment of the present disclosure.

To continue, a function configuration example of the position estimation apparatus 10A according to the first embodiment of the present disclosure will be described. FIG. 2 is a figure which shows a function configuration example of the position estimation apparatus 10A according to the first embodiment of the present disclosure. As shown in FIG. 2, the position estimation apparatus 10A according to the first embodiment of the present disclosure includes a control unit 110A, a storage unit 120, and a communication unit 130.

The control unit 110A corresponds to, for example, a processor such as a Central Processing Unit (CPU). The control unit 110A exhibits various functions of the control unit 110, by executing programs stored in the storage unit 120 or another storage medium. The control unit 110A has an identification information provision unit 111, a data acquisition unit 112, and a position estimation unit 113A. The functions of each of these function blocks will be described below.

The storage unit 120 stores programs for operating the control unit 110, by using a storage medium such as a semiconductor memory or a hard disk. Further, for example, the storage unit 120 can store various types of data used by the programs. Note that, in the example shown in FIG. 2, while the storage unit 120 is integrated with the position estimation apparatus 10A, the storage unit 120 may be constituted in a separate body to the position estimation apparatus 10A.

It is possible for the communication unit 130 to perform communication with another apparatus (for example, the target terminal 20, the communication terminal 30, the base station 40 or the like). In the case where communication is performed between the target terminal 20 and the communication terminal 30, for example, it is possible for the communication unit 130 to perform communication via the base station 40. The form of the communication by the communication unit 130 is not particularly limited, and the communication by the communication unit 130 may be communication by wireless, or may be communication by wires. Note that, in the example shown in FIG. 2, while the communication unit 130 is integrated with the position estimation apparatus 10A, the communication unit 130 may be constituted in a separate body to the position estimation apparatus 10A.

Here, as described above, when a wireless signal including a MAC address of the target terminal 20 is sent to the surroundings, there is the possibility that information related to a user of the target terminal 20 is acquired by another person, and there is the possibility that it may lead to an infringement of the user's privacy. Therefore, in an embodiment of the present disclosure, identification information temporarily issued by the position estimation apparatus 10A is used.

Specifically, the identification information provision unit 111 temporarily issues prescribed identification information, and provides the temporarily issued prescribed identification information to the target terminal 20. Note that, hereinafter, while the case where a Service Set Identifier (SSID) is used as identification information will be described, the identification information may be other than an SSID. The prescribed identification information may be identification information which includes a prescribed character string decided in advance at a prescribed position (for example, identification information or the like in which the three characters from the front are "kzt"), or may be arbitrary identification information.

The identification information provision unit 111 may add the issued prescribed identification information to a list of temporarily issued prescribed identification information. The list may be provided to the communication terminal 30 by the identification information provision unit 111. The timing at which the list is provided to the communication terminal 30 is not particularly limited. For example, the identification information provision unit 111 may periodically provide the list to the communication terminal 30, or may provide the list to the communication terminal 30 in accordance with a request from the communication terminal 30.

Further, hereinafter, while a prescribed SSID will be used as the prescribed identification information, the prescribed identification information may be other than an SSID. The timing at which the prescribed SSID is provided to the target terminal 20 by the identification information provision unit 111 is not particularly limited. For example, in the case where an issue of an SSID has been requested from the target terminal 20, the identification information provision unit 111 may issue the prescribed SSID to be provided to the target terminal 20.

The prescribed SSID issued by the identification information provision unit 111 may be registered, for example, in association with terminal identification information of the target terminal 20 (for example, session information or the like set with the target terminal 20). In this situation, terminal identification information associated with the prescribed SSID included in transmission data transmitted from the communication terminal 30 may be used, when specifying a provision destination of an estimation result by the position estimation unit 113A.

In such a case, the prescribed SSID is used for identifying the target terminal 20 of a provision destination of an estimation result of a position. Accordingly, the issue of an SSID may be uniquely issued for the target terminal 20. Note that, the session information may be a session key, may be Cookie information, or may be a universally unique identifier (UUID).

On the other hand, the communication terminal 30 receives a wireless signal. Various types of wireless signals are assumed as the wireless signal received by the communication terminal 30. For example, it is possible for the communication terminal 30 to receive a wireless signal transmitted from the base station 40, or it is possible to receive a wireless signal transmitted from the target terminal 20. The data acquisition unit 112A acquires transmission data transmitted from the communication terminal 30 receiving the wireless signal.

In the case where an SSID included in the transmission data is a prescribed SSID notified to the communication terminal 30 from the target terminal 20 by the wireless signal, the position estimation unit 113A estimates a position of the target terminal 20 based on position information of the communication terminal 30. For example, in the case where the communication terminal 30 is a fixed-type terminal, the position information of the communication terminal 30 may be registered in the position estimation apparatus 10A in advance, and in the case where the communication terminal 30 is a moving-type terminal, the position information of the communication terminal 30 may be notified to the position estimation apparatus 10A from the communication terminal 30 by the transmission data.

It is possible to adopt various techniques as an estimation technique of a position of the target terminal 20. For example, the position estimation unit 113A may specify position information of the communication terminal 30 as position information of the target terminal 20. Alternatively, in the case where a reception strength of the wireless signal in the communication terminal 30 is included in the transmission data, the position estimation unit 113A may estimate a position of the target terminal 20 based on the reception strength and the position information of the communication terminal 30. For example, the position estimation unit 113A may calculate a distance corresponding the reception strength, and may estimate a position separated only by this distance from a position of the communication terminal 30 as a position of the target terminal 20. For example, in the case where the wireless signal has directivity, the position estimation unit 113A may estimate a position tracing back in a direction of the sending source of the wireless signal by only this distance from a position of the communication terminal 30 as a position of the target terminal 20. Further, for example, in the case where the communication terminal 30 is positioned on a wall side, it is possible for the position estimation unit 113A to narrow the direction of the target terminal 20. Further, a technique may be adopted such as that which will be described in a second embodiment of the present disclosure.

The form of the position information is not particularly limited. That is, for example, the position information may be a latitude and longitude, may be a form using polar coordinates, or may be a form using vectors. Further, it may be unique position information in a prescribed region used within the prescribed region. For example, the position information may be unique facility position information used inside of a prescribed facility (for example, inside of a facility or the like such as a zoo or museum).

For example, the prescribed SSID temporarily issued by the identification information provision unit 111 may expire at a prescribed timing. That is, in the case where a prescribed expiration condition has been satisfied after issuing the prescribed SSID, the identification information provision unit 111 may cause the prescribed SSID to expire. Further, as described above, in the case where the prescribed SSID has been caused to expire, the identification information provision unit 111 may delete the expired prescribed SSID from the list. Further, in the case where the prescribed SSID has expired by the identification information provision unit 111, the communication unit 130 may transmit an expiration notification to the target terminal 20.

Here, the prescribed expiration condition is not particularly limited. For example, the prescribed expiration condition may be a condition where a prescribed time has lapsed after issuing the prescribed SSID. In such a case, the prescribed time may be decided in advance.

Further, the prescribed expiration condition may be a condition where a position of the target terminal 20 has deviated from a prescribed region. Here, the prescribed region is not particularly limited. For example, in the case where position information inside of a prescribed facility is registered in advance in the position estimation apparatus 10A, the prescribed region may be inside of this prescribed facility. For example, this is because, in the case where the target terminal 20 exists inside of a prescribed region, outputting information corresponding to a position of the target terminal 20 (for example, displaying an advertisement related to an event on a display device installed near to a position of the target terminal 20) is also assumed. Alternatively, the prescribed expiration condition may be a condition where the target terminal 20 has entered a prescribed region (for example, a region in the vicinity of the exit of the facility). The position estimated by the position estimation unit 113A may be used as a position of the target terminal 20.

Further, in the case where an application using a position of the target terminal 20 is executed, or in the case where an execution of this application has ended, the case is also assumed where it may not be necessary to estimate a position of the target terminal 20. Therefore, the prescribed expiration condition may be a condition where an execution of an application using a position of the target terminal 20 has ended. The application using a position of the target terminal 20 is not particularly limited. For example, the application using a position of the target terminal 20 may be executed in the target terminal 20, or may be executed in a terminal other than the target terminal 20.

Further, in the case where an operation for causing the prescribed SSID to expire has been input from a user, the prescribed SSID may be caused to expire. That is, the prescribed expiration condition may be a condition where a prescribed operation from a user has been input for the target terminal 20. The prescribed operation may be an operation allocated in advance for an operation which causes the prescribed SSID to expire. For example, the prescribed operation may be an operation for selecting a prescribed object displayed by the target terminal 20.

The case is also assumed where an SSID included in the transmission data acquired by the data acquisition unit 112 is other than the prescribed SSID. The operation of the position estimation apparatus 10A of such a case is not particularly limited. For example, in the case where an SSID included in the transmission data is other than the prescribed SSID, the position estimation unit 113A may estimate a position of the communication terminal 30 based on position information of the base station 40 transmitting a wireless signal to the communication terminal 30. For example, in the case where an identifier of the base station 40 transmitting a wireless signal to the communication terminal 30 is included in the transmission data, the position estimation unit 113A may use position information of the base station 40 registered in advance in association with the identifier of this base station 40.

It is possible to adopt various techniques as an estimation technique of a position of the communication terminal 30. For example, the position estimation unit 113A may specify position information of the base station 40 as position information of the communication terminal 30. Alternatively, in the case where a reception strength of the wireless signal in the communication terminal 30 is included in the transmission data, the position estimation unit 113A may estimate a position of the communication terminal 30 based on the reception strength and the position information of the base station 40. For example, the position estimation unit 113A may calculate a distance corresponding to the reception strength, and may estimate a position separated only by this distance from a position of the base station 40 as a position of the communication terminal 30.

Further, in the case where a plurality of base stations 40 transmitting a wireless signal to the communication terminal 30 exist, the position estimation unit 113A may estimate a position of the communication terminal 30, based on position information of each of these plurality of base stations 40. For example, the position estimation unit 113A may estimate a position of the communication terminal 30 by the principle of triangulation, based on position information of each of these plurality of base stations 40, and a reception strength in the communication terminal 30 of a wireless signal transmitted from each of these plurality of base stations 40. Other than this, in the case where the communication terminal 30 has a position measurement function by a Global Positioning System (GPS), the position estimation unit 113A may perform its own position estimation using this position measurement function, and in the case where the communication terminal 30 has an acceleration sensor, it may perform its own position estimation using detection data by this acceleration sensor.

As described above, in an embodiment of the present disclosure, the position estimation apparatus 10A provides temporarily issued prescribed identification information to the target terminal 20, and the target terminal 20 sends the prescribed identification information provided from the position estimation apparatus 10A to the communication terminal 30. Therefore, since a wireless signal including a MAC address of the target terminal 20 is not sent to the surroundings, the possibility that information related to a user of the target terminal 20 is acquired by another person can be reduced, and the possibility that it may lead to an infringement of the user's privacy can be reduced.

[1.3. Operation Example of the Position Estimation Apparatus]

Figure 3:
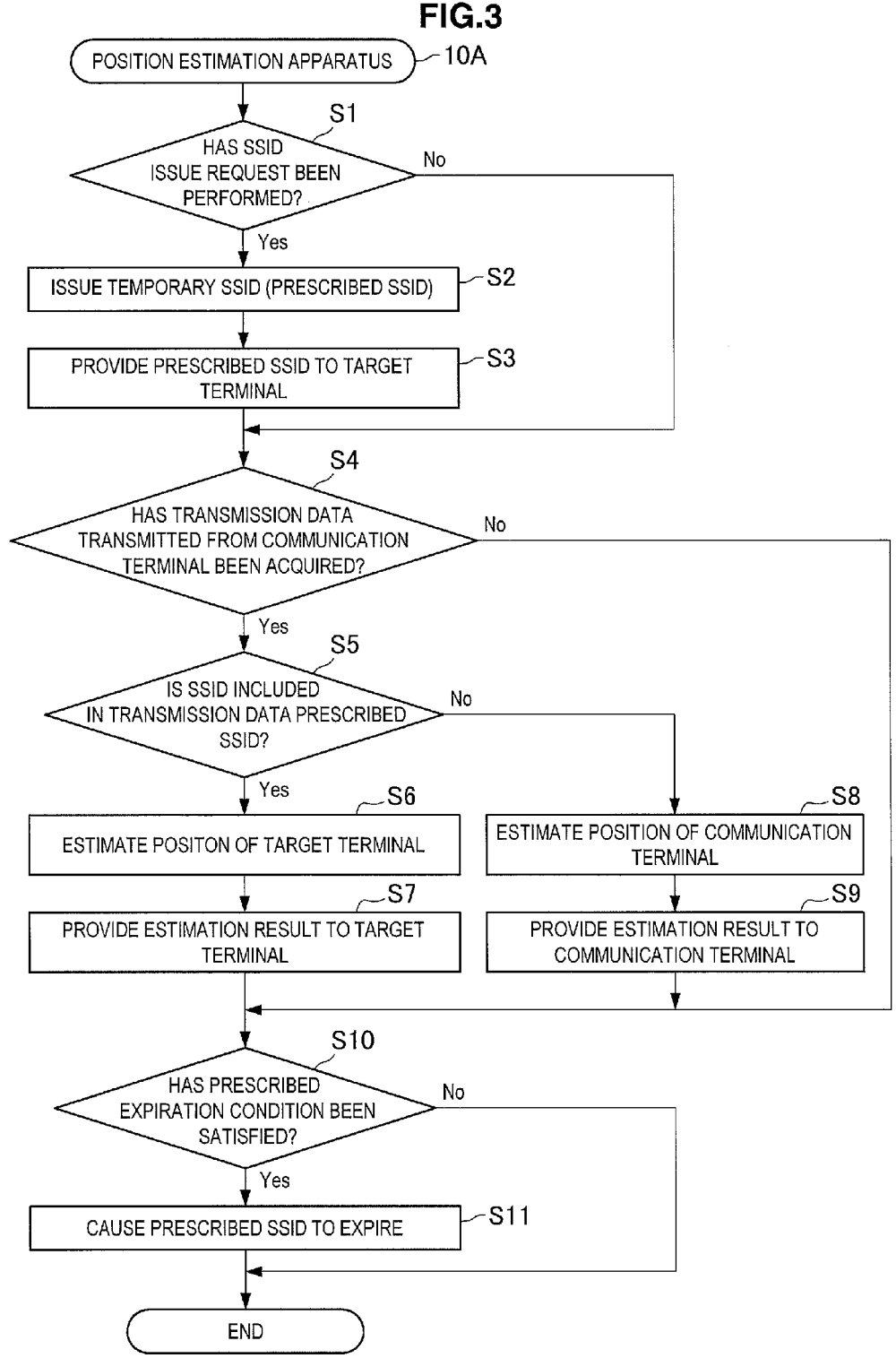
FIG. 3 is a flow chart which shows an operation example of the position estimation apparatus according to the first embodiment of the present disclosure.

To continue, an operation example of the position estimation apparatus 10A according to the first embodiment of the present disclosure will be described. FIG. 3 is a figure which shows an operation example of the position estimation apparatus 10A according to the first embodiment of the present disclosure. Note that, the operation example of the position estimation apparatus 10A shown in FIG. 3 is merely an example of an operation of the position estimation apparatus 10A. Therefore, the operation of the position estimation apparatus 10A is not limited to the operation example of the position estimation apparatus 10A shown in FIG. 3.

As shown in FIG. 3, in the case where a request has been received by the communication unit 130, the identification information provision unit 111 determines whether or not an SSID issue request has been performed from the target terminal 20 (S1). In the case where an SSID issue request has not been performed from the target terminal 20 ("NO" in S1), the identification information provision unit 111 proceeds to S4. On the other hand, in the case where an SSID issue request has been performed from the target terminal 20 ("YES" in S1), the identification information provision unit 111 issues a temporary SSID (prescribed SSID) (S2), and provides the prescribed SSID to the target terminal 20 (S3). The issued prescribed SSID can be retained in the storage unit 120.

To continue, in the case where transmission data has not been acquired by the data acquisition unit 112 ("NO" in S4), the identification information provision unit 111 proceeds to S10. On the other hand, in the case where transmission data transmitted from the communication terminal 30 has been received by the communication unit 130, and the transmission data has been acquired by the data acquisition unit 112 ("YES" in S4), the position estimation unit 113A proceeds to S5.

To continue, in the case where an SSID included in the transmission data is the prescribed SSID ("YES" in S5), the position estimation unit 113A estimates a position of the target terminal 20 based on position information of the communication terminal 30, and provides an estimation result to the target terminal 20 (S7). On the other hand, in the case where an SSID included in the transmission data is other than the prescribed SSID ("NO" in S5), the position estimation unit 113A estimates a position of the communication terminal 30 based on position information of the base station 40, and provides an estimation result to the communication terminal 30 (S9).

To continue, in the case where a prescribed expiration condition has not been satisfied ("NO" in S10), the identification information provision unit 111 ends the operation, and in the case where a prescribed expiration condition has been satisfied ("YES" in S10), the operation is ended by causing the prescribed SSID to expire (S11). Note that, instead of the operation ending, the operation may return to S1, or another operation may be performed.

[1.4. Function Configuration Example of the Target Terminal]

Figure 4:
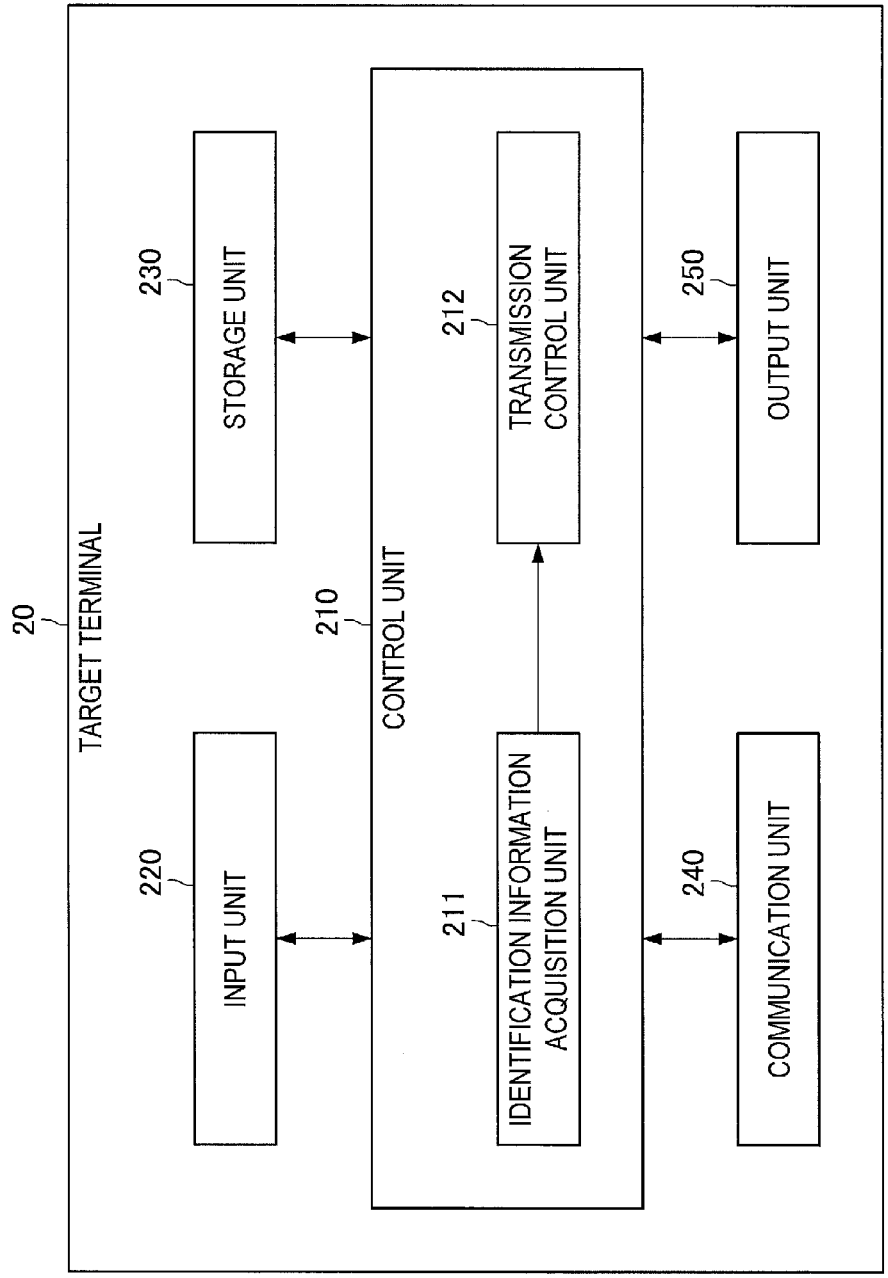
FIG. 4 is a figure which shows a function configuration example of a target terminal according to the first embodiment of the present disclosure.

To continue, a function configuration example of the target terminal 20 according to the first embodiment of the present disclosure will be described. FIG. 4 is a figure which shows a function configuration example of the target terminal 20 according to the first embodiment of the present disclosure. As shown in FIG. 4, the target terminal 20 according to the first embodiment of the present disclosure includes a control unit 210, an input unit 220, a storage unit 230, a communication unit 240, and an output unit 250.

The control unit 210 corresponds to, for example, a processor such as a Central Processing Unit (CPU). The control unit 210 exhibits various functions of the control unit 210, by executing programs stored in the storage unit 230 or another storage medium. The control unit 210 has an identification information acquisition unit 211, and a transmission control unit 212. The functions of each of these function blocks will be described below.

The input unit 220 detects a user operation to be output to the control unit 210. In the present disclosure, since the case will be assumed where the input unit 220 is constituted by a touch panel, the user operation is input by setting a finger of the user as an operation body. However, the input unit 220 may be constituted by hardware other than a touch panel. Note that, in the example shown in FIG. 4, while the input unit 220 is integrated with the target terminal 20, the input unit 220 may be constituted in a separate body to the target terminal 20.

The storage unit 230 stores programs for operating the control unit 210, by using a storage medium such as a semiconductor memory or a hard disk. Further, for example, the storage unit 230 can store various types of data used by the programs. Note that, in the example shown in FIG. 4, while the storage unit 230 is integrated with the target terminal 20, the storage unit 230 may be constituted in a separate body to the target terminal 20.

It is possible for the communication unit 240 to perform communication with another apparatus (for example, the position estimation apparatus 10A, the communication terminal 30, the base station 40 or the like). In the case where communication is performed with the position estimation apparatus 10A, for example, it is possible for the communication unit 240 to perform communication via the base station 40. The form of the communication by the communication unit 240 is not particularly limited, and the communication by the communication unit 240 may be communication by wireless. Note that, in the example shown in FIG. 4, while the communication unit 240 is integrated with the target terminal 20, the communication unit 240 may be constituted in a separate body to the target terminal 20.

The output unit 250 has a function which outputs various types of information according to a control by the control unit 210. The type of information output by the output unit 250 is not particularly limited. Therefore, the information output by the output unit 250 may be an image (for example, a still image, a moving image or the like), or may be audio. In the following description, while the case will be mainly assumed where the output unit 250 is a display device, the output unit 250 may be another output apparatus (for example, an audio output apparatus). Note that, in the example shown in FIG. 4, while the output unit 250 is integrated with the target terminal 20, the output unit 250 may be constituted in a separate body to the target terminal 20.

As described above, in an embodiment of the present disclosure, identification information temporarily issued by the position estimation apparatus 10A is used. Accordingly, in the target terminal 20, the identification information acquisition unit 211 acquires a temporarily issued prescribed SSID from the position estimation apparatus 10A. For example, the identification information acquisition unit 211 provides an SSID issue request to the position estimation apparatus 10A, and acquires a prescribed SSID from the position estimation apparatus 10A as this response. Then, the transmission control unit 212 performs a control so that the prescribed SSID is notified to the communication terminal 30 by a wireless signal.

Afterwards, in the case where identification information included in transmission data transmitted to the position estimation apparatus 10A from the communication terminal 30 is the prescribed SSID, a position of the target terminal 20 is estimated by the position estimation apparatus 10A based on position information of the communication terminal 30. Here, the timing at which an SSID issue request is provided to the position estimation apparatus 10A by the identification information acquisition unit 211 is not particularly limited. For example, in the case where a prescribed operation for a position estimation has been input by a user of the target terminal 20, an SSID issue request may be provided to the position estimation apparatus 10A by the identification information acquisition unit 211. For example, a user can input a prescribed operation by using a Web browser.

While the prescribed SSID provided from the position estimation apparatus 10A is controlled so as to be notified to the communication terminal 30 by a wireless signal, any such communication may be performed. For example, the transmission control unit 212 may perform a control so that the prescribed SSID is notified to the communication terminal 30 by a tethering function. Here, the tethering function can be a function for connecting another terminal to a network such as the internet by using a communication function of the terminal.

Figure 5:
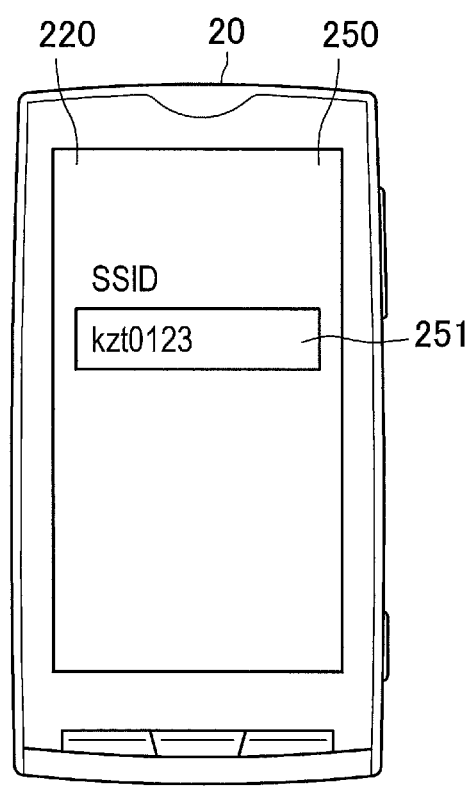
FIG. 5 is a figure which shows an example of a tethering setting screen displayed by an output unit of the target terminal.

FIG. 5 is a figure which shows an example of a tethering setting screen displayed by the output unit 250 of the target terminal 20. As shown in FIG. 5, for example, in the case where the prescribed SSID provided from the position estimation apparatus 10A is "kzt0123", "kzt0123" which is the prescribed SSID is set to a setting column 251 of the tethering setting screen. To continue, in the case where a prescribed operation for starting tethering has been performed by a user, tethering is started by setting the prescribed SSID set in the setting column 251 as an SSID. As a result of this, the prescribed SSID is notified to the communication terminal 30 by a wireless signal.

[1.5. Operation Example of the Target Terminal]

Figure 6:
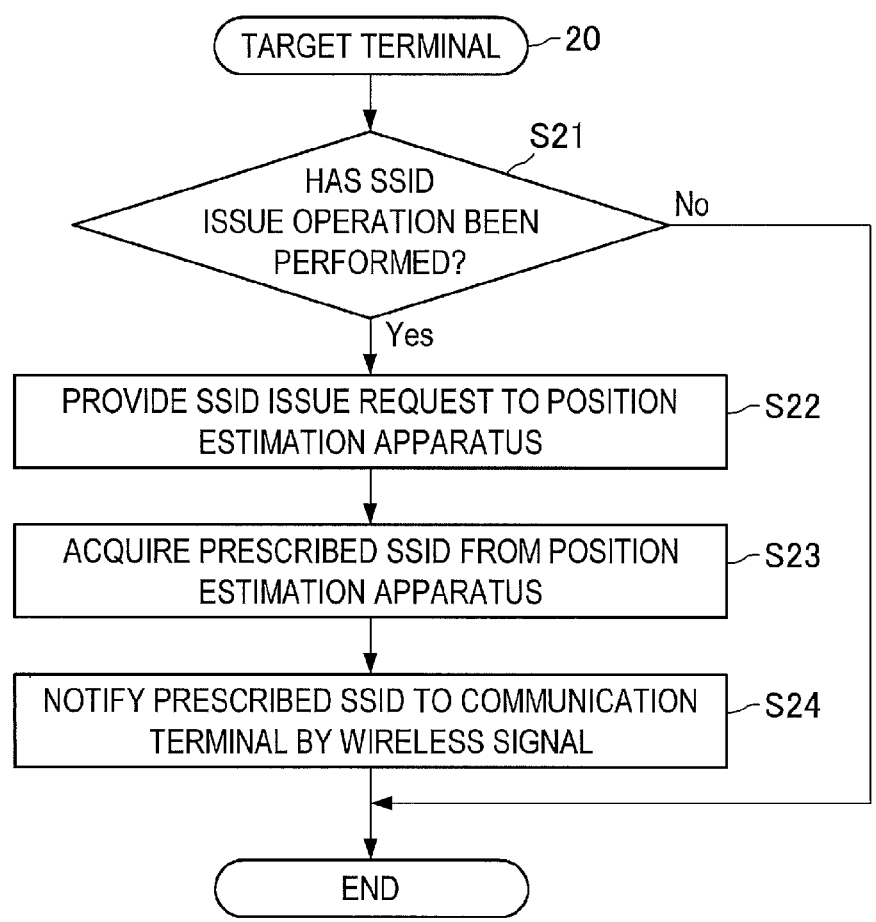
FIG. 6 is a flow chart which shows an operation example of the target terminal according to the first embodiment of the present disclosure.

To continue, an operation example of the target terminal 20 according to the first embodiment of the present disclosure will be described. FIG. 6 is a figure which shows an operation example of the target terminal 20 according to the first embodiment of the present disclosure. Note that, the operation example of the target terminal 20 shown in FIG. 6 is merely an example of an operation of the target terminal 20. Therefore, the operation of the target terminal 20 is not limited to the operation example of the target terminal 20 shown in FIG. 6.

As shown in FIG. 6, in the case where an SSID issue operation has been performed ("YES" in S21), the identification information acquisition unit 211 provides an SSID issue request to the position estimation apparatus 10A (S22). To continue, the identification information acquisition unit 211 acquires a prescribed SSID from the position estimation apparatus 10A (S23), and the transmission control unit 212 notifies the prescribed SSID to the communication terminal 30 by a wireless signal (S24). In the case where an SSID issue operation has not been performed ("NO" in S21), the operation ends. Note that, instead of the operation ending, the operation may return to S21, or another operation may be performed.

[1.6. Function Configuration Example of the Communication Terminal]

Figure 7:
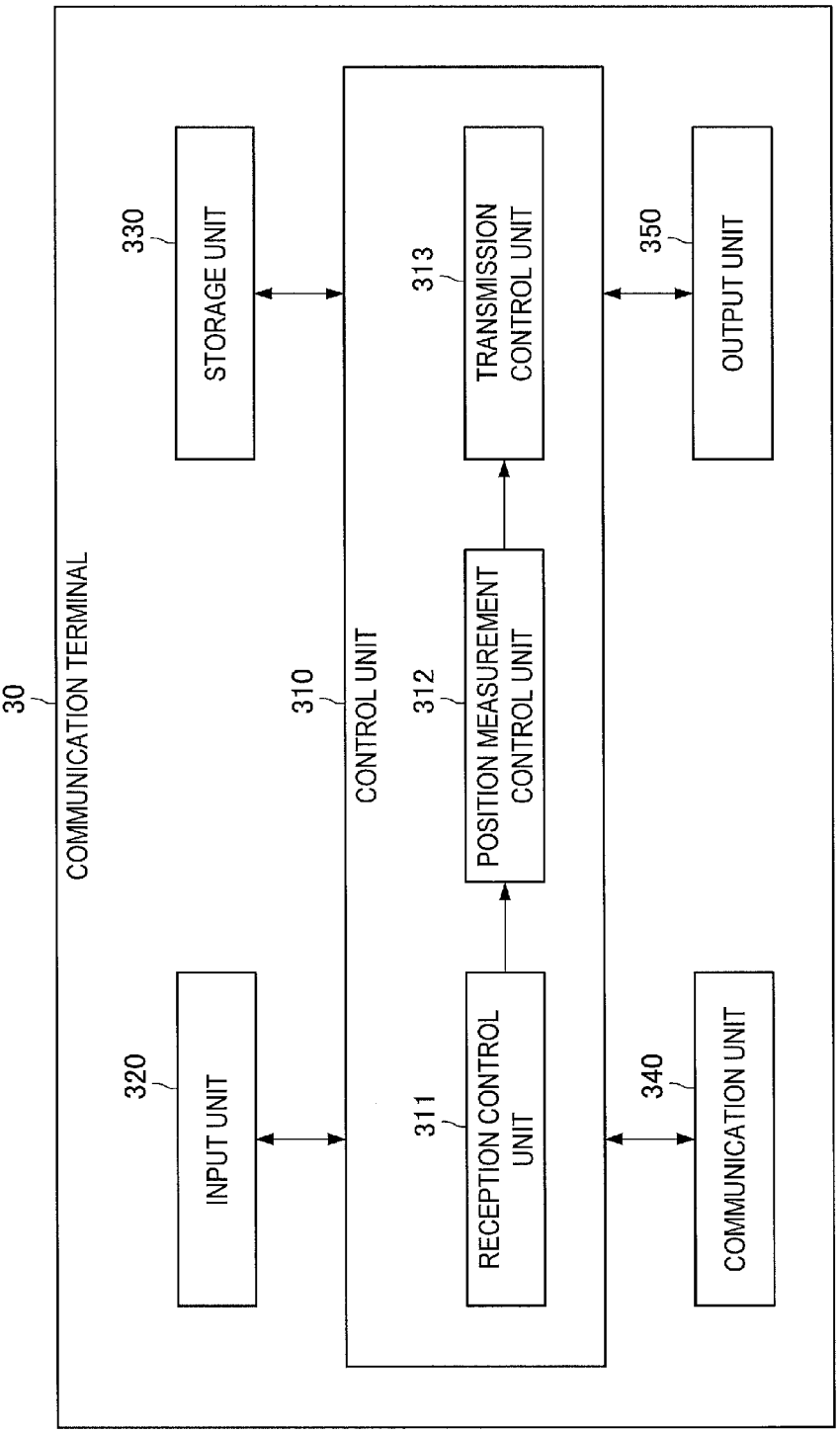
FIG. 7 is a figure which shows a function configuration example of a communication terminal according to the first embodiment of the present disclosure.

To continue, a function configuration example of the communication terminal 30 according to the first embodiment of the present disclosure will be described. FIG. 7 is a figure which shows a function configuration example of the communication terminal 30 according to the first embodiment of the present disclosure. As shown in FIG. 7, the communication terminal 30 according to the first embodiment of the present disclosure includes a control unit 310, an input unit 320, a storage unit 330, a communication unit 340, and an output unit 350.

The control unit 310 corresponds to, for example, a processor such as a Central Processing Unit (CPU). The control unit 310 exhibits various functions of the control unit 310, by executing programs stored in the storage unit 330 or another storage medium. The control unit 310 has a reception control unit 311, a position measurement control unit 312, and a transmission control unit 313. The functions of each of these function blocks will be described below.

The input unit 320 detects a user operation to be output to the control unit 310. In the present disclosure, since the case will be assumed where the input unit 320 is constituted by a touch panel, the user operation is input by setting a finger of the user as an operation body. However, the input unit 320 may be constituted by hardware other than a touch panel. Note that, in the example shown in FIG. 7, while the input unit 320 is integrated with the communication terminal 30, the input unit 320 may be constituted in a separate body to the communication terminal 30.

The storage unit 330 stores programs for operating the control unit 310, by using a storage medium such as a semiconductor memory or a hard disk. Further, for example, the storage unit 330 can store various types of data used by the programs. Note that, in the example shown in FIG. 7, while the storage unit 330 is integrated with the communication terminal 30, the storage unit 330 may be constituted in a separate body to the communication terminal 30.

It is possible for the communication unit 340 to perform communication with another apparatus (for example, the position estimation apparatus 10A, the target terminal 20, the base station 40 or the like). In the case where communication is performed with the position estimation apparatus 10A, for example, it is possible for the communication unit 340 to perform communication via the base station 40. The form of the communication by the communication unit 340 is not particularly limited, and the communication by the communication unit 340 may be communication by wireless. Note that, in the example shown in FIG. 7, while the communication unit 340 is integrated with the communication terminal 30, the communication unit 340 may be constituted in a separate body to the communication terminal 30.

The output unit 350 has a function which outputs various types of information according to a control by the control unit 310. The type of information output by the output unit 350 is not particularly limited. Therefore, the information output by the output unit 350 may be an image (for example, a still image, a moving image or the like), or may be audio. In the following description, while the case will be mainly assumed where the output unit 350 is a display device, the output unit 350 may be another output apparatus (for example, an audio output apparatus). Note that, in the example shown in FIG. 7, while the output unit 350 is integrated with the communication terminal 30, the output unit 350 may be constituted in a separate body to the target terminal 20.

As described above, in an embodiment of the present disclosure, identification information temporarily issued by the position estimation apparatus 10A is used. Accordingly, in the communication terminal 30, the reception control unit 311 performs a control so that a wireless signal is received. Then, in the case where a temporarily issued prescribed SSID has been notified from the target terminal 20 by the wireless signal, the transmission control unit 313 performs a control so that transmission data including the prescribed SSID as an SSID is transmitted to the position estimation apparatus 10A. In the case where an SSID notified by the wireless signal is the prescribed SSID, a position of the target terminal 20 is estimated by the position estimation apparatus 10A based on position information of the communication terminal 30.

Various wireless signals are assumed as the type of wireless signal received by the communication terminal 30. For example, there will be cases where the communication terminal 30 receives a wireless signal transmitted from the base station 40, and there will be cases where it receives a wireless signal transmitted from the target terminal 20. Accordingly, for example, in the case where an SSID notified by the wireless signal satisfies a prescribed condition, the transmission control unit 313 may determine that the prescribed SSID has been notified by the wireless signal from the target terminal 20.

Here, the prescribed condition may be any such condition. For example, the prescribed condition may be a condition where the SSID notified by the wireless signal includes a prescribed character string decided in advance. Alternatively, the prescribed condition may be a condition where the SSID notified by the wireless signal includes a prescribed character string decided in advance at a prescribed position (for example, including "kzt" in the three characters from the front).

Alternatively, the prescribed condition may be a condition where the SSID notified by the wireless signal is included in a list of temporarily issued prescribed SSID provided from the position estimation apparatus 10A. As described above, the list may be periodically acquired from the position estimation apparatus 10A, or may be acquired from the position estimation apparatus 10A in accordance with a request from the communication terminal 30. This request may be performed prior to determining whether or not a prescribed condition has been satisfied.

On the other hand, in the case where the SSID notified by the wireless signal is other than the prescribed SSID, the transmission control unit 313 may perform any such operation. As an example, in the case where the SSID notified by the wireless signal is other than the prescribed SSID, the transmission control unit 313 may perform a control so that transmission data including an identifier of the base station 40 transmitting the wireless signal is transmitted to the position estimation apparatus 10A. In this situation, a position of the communication terminal 30 is estimated, based on position information of the base station 40 registered in association with the identifier of the base station 40 in the position estimation apparatus 10A.

In such a case, an identifier of the target terminal 20 notifying the prescribed SSID to the communication terminal 30 by the wireless signal is not able to be included in the transmission data. This is because there is the possibility that a position of the target terminal 20 notifying the prescribed SSID is not estimated in the position estimation apparatus 10A, and so it is assumed that position information of the target terminal 20 is not able to be used, in order to estimate a position of the communication terminal 30.

Therefore, in the case where the prescribed SSID has been notified from the target terminal 20 by one wireless signal, and in the case where the SSID notified by another wireless signal is other than the prescribed SSID, the transmission control unit 313 may perform a control so that transmission data including an identifier of the base station 40 transmitting this other wireless signal and not including an identifier of the target terminal 20 is transmitted to the position estimation apparatus 10A.

Various information can be included in the transmission data. For example, a reception strength of the wireless signal received by the communication terminal 30 may be included in the transmission data. That is, in the case where the SSID notified by the wireless signal is the prescribed SSID, the transmission control unit 313 may perform a control so that transmission data including the reception strength of the wireless signal and the prescribed SSID is transmitted to the position estimation apparatus 10A. In such a case, in the position estimation apparatus 10A, a position of the target terminal 20 is estimated based on the reception strength and the position information of the communication terminal 30.

While position information of the communication terminal 30 is used in a position estimation of the target terminal 20 in the position estimation apparatus 10A, for example, position information of the communication terminal 30 may be transmitted from the communication terminal 30. That is, in the case where the SSID notified by the wireless signal is the prescribed SSID, the transmission control unit 313 may perform a control so that transmission data including position information of the communication terminal 30 and the prescribed SSID is transmitted to the position estimation apparatus 10A. Note that, in the case where position information of the communication terminal 30 is registered in advance in the position estimation apparatus 10A, position information of the communication terminal 30 may not be transmitted to the position estimation apparatus 10A.

As described above, while position information of the communication terminal 30 is used, when a position of the target terminal 20 is estimated, in the case where the communication terminal 30 is a moving-type terminal, there is the possibility that a position of the communication terminal 30 changes by having the communication terminal 30 move. Accordingly, in the case where a position estimation of the target terminal 20 is performed, a position measurement interval of the communication terminal 30 may be shortened. That is, in the case where the SSID notified by the wireless signal is the prescribed SSID, the position measurement control unit 312 may perform a control so that a position measurement interval of the communication terminal 30 is shortened. The technique of the position measurement of the communication terminal 30 is not limited, and it may be a technique similar to or a technique different to a position estimation of the target terminal 20.

[1.7. Operation Example of the Communication Terminal]

Figure 8:
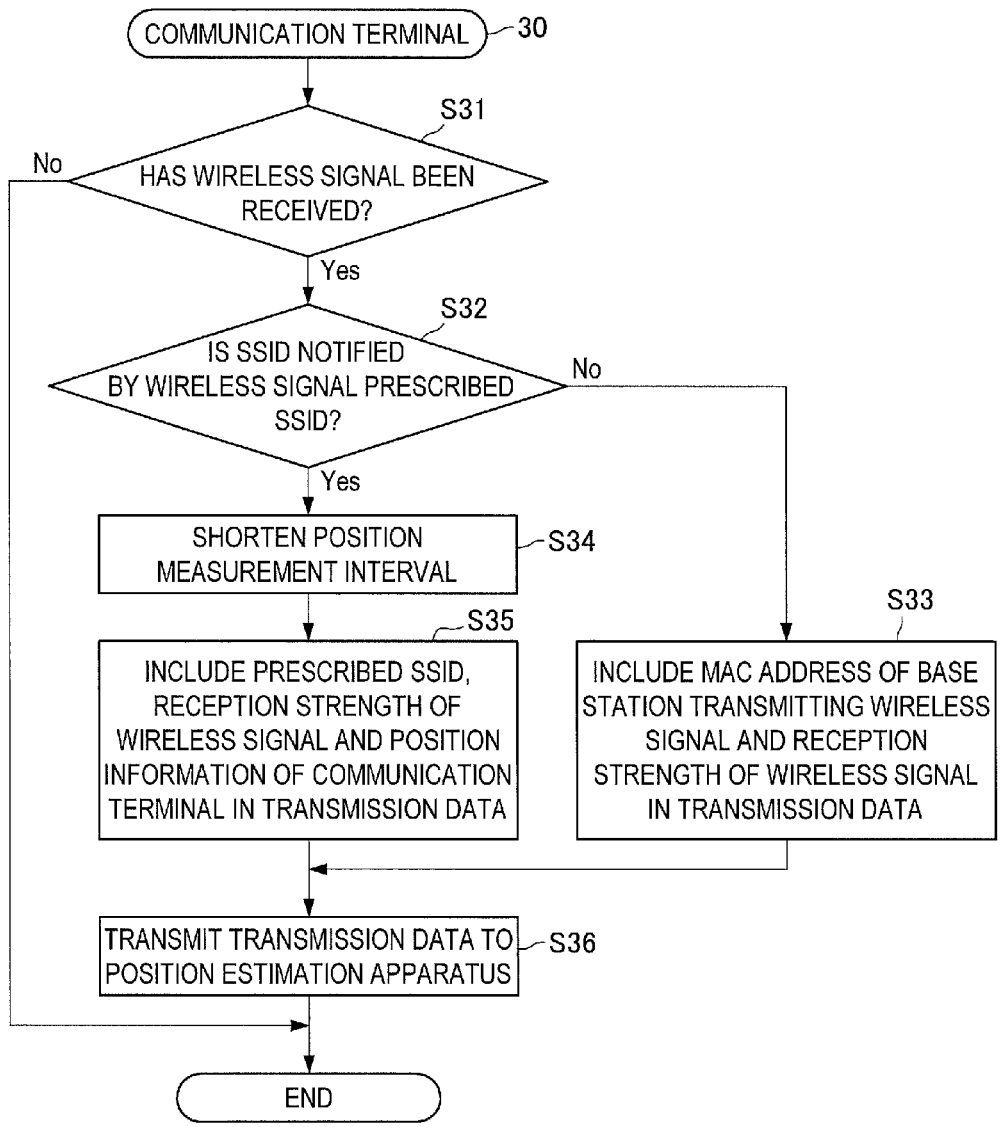
FIG. 8 is a flow chart which shows an operation example of the communication terminal according to the first embodiment of the present disclosure.

To continue, an operation example of the communication terminal 30 according to the first embodiment of the present disclosure will be described. FIG. 8 is a figure which shows an operation example of the communication terminal 30 according to the first embodiment of the present disclosure. Note that, the operation example of the communication terminal 30 shown in FIG. 8 is merely an example of an operation of the communication terminal 30. Therefore, the operation of the communication terminal 30 is not limited to the operation example of the communication terminal 30 shown in FIG. 8.

As shown in FIG. 8, in the case where a wireless signal has been received by the communication unit 340 ("YES" in S31), the reception control unit 311 proceeds to S32, and in the case where a wireless signal has not been received by the communication unit 340 ("NO" in S31), the operation ends. Note that, instead of the operation ending, the operation may return to S31, or another operation may be performed.

To continue, in the case where the SSID notified by the wireless signal is other than the prescribed SSID ("NO" in S32), the transmission control unit 313 proceeds to S36, by including a MAC address of the base station 40, as an example of an identifier of the base station 40 transmitting the wireless signal, and a reception strength of the wireless signal in transmission data (S33). On the other hand, in the case where the SSID notified by the wireless signal is the prescribed SSID ("YES" in S32), the position measurement control unit 312 shortens a position measurement interval (S34), and the transmission control unit 313 includes the prescribed SSID, a reception strength of the wireless signal and position information of the communication terminal 30 in transmission data (S35).

To continue, when the transmission control unit 313 performs a control so that the transmission data is transmitted to the position estimation apparatus 10A, the communication unit 340 transmits the transmission data to the position estimation apparatus 10A according to a control by the transmission control unit 313 (S36), and the operation ends. Note that, instead of the operation ending, the operation may return to S31, or another operation may be performed.

[1.8. Operation Example of the Position Estimation System]

Figure 9:
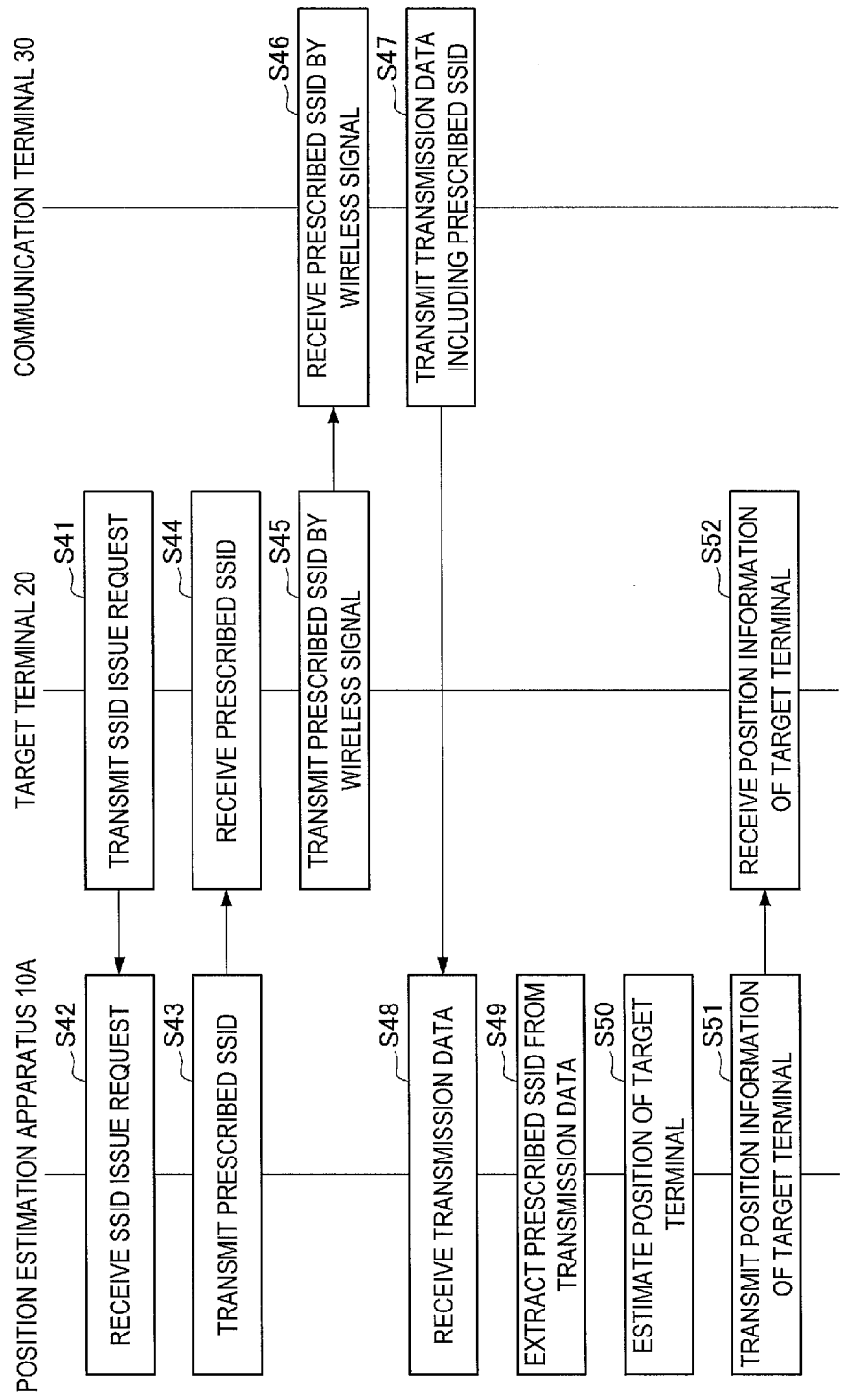
FIG. 9 is a sequence diagram which shows an operation example (the case where the communication terminal receives a prescribed SSID by a wireless signal) of the position estimation system according to the first embodiment of the present disclosure.

To continue, an operation example of the position estimation system 1A according to the first embodiment of the present disclosure will be described. Here, in particular, an operation example of the case where the communication terminal 30 receives a prescribed SSID by a wireless signal will be described. FIG. 9 is a sequence diagram which shows an operation example of the position estimation system 1A according to the first embodiment of the present disclosure. In particular, FIG. 9 shows an operation example of the case where the communication terminal 30 receives a prescribed SSID by a wireless signal. Note that, the operation example of the position estimation system 1A shown in FIG. 9 is merely an example of an operation of the position estimation system 1A. Therefore, the operation of the position estimation system 1A is not limited to the operation example of the position estimation system 1A shown in FIG. 9.

First, in the target terminal 20, the identification information acquisition unit 211 provides an SSID issue request. That is, the communication unit 240 transmits an SSID issue request to the position estimation apparatus 10A (S41). In the position estimation apparatus 10A, when the SSID issue request is received by the communication unit 130 (S42), the identification information provision unit 111 issues a prescribed SSID, and provides the issued prescribed SSID. That is, the communication unit 130 transmits the issued prescribed SSID to the target terminal 20 (S43). In the target terminal 20, when the prescribed SSID is received by the communication unit 240, the prescribed SSID is acquired by the identification information acquisition unit 211.

To continue, in the target terminal 20, when the transmission control unit 212 performs a control so that the prescribed SSID is transmitted by a wireless signal, the communication unit 240 transmits the prescribed SSID to the communication terminal 30 by a wireless signal (S45). In the communication terminal 30, when the communication unit 340 receives the prescribed SSID transmitted by the wireless signal (S46), the prescribed SSID is acquired from the wireless signal by the reception control unit 311.

After the prescribed SSID has been included in transmission data by the transmission control unit 313, a control is performed so that the transmission data including the prescribed SSID is transmitted to the position estimation apparatus 10A by the transmission control unit 313. The transmission data including the prescribed SSID is transmitted to the position estimation apparatus 10A by the communication unit 340 (S47).

In the position estimation apparatus 10A, when the transmission data transmitted from the communication terminal 30 is received by the communication unit 130 (S48), the data acquisition unit 112 extracts the prescribed SSID from the transmission data (S49). When the prescribed SSID is extracted from the transmission data by the data acquisition unit 112, the position estimation unit 113A estimates a position of the target terminal 20 based on position information of the communication terminal 30 (S50).

To continue, the position estimation unit 113A provides position information of the target terminal 20 to the target terminal 20. That is, the communication unit 130 transmits position information of the target terminal 20 to the target terminal 20. In the target terminal 20, when the position information of the target terminal 20 is received by the communication unit 240, the position information of the target terminal 20 is acquired.

Figure 10:
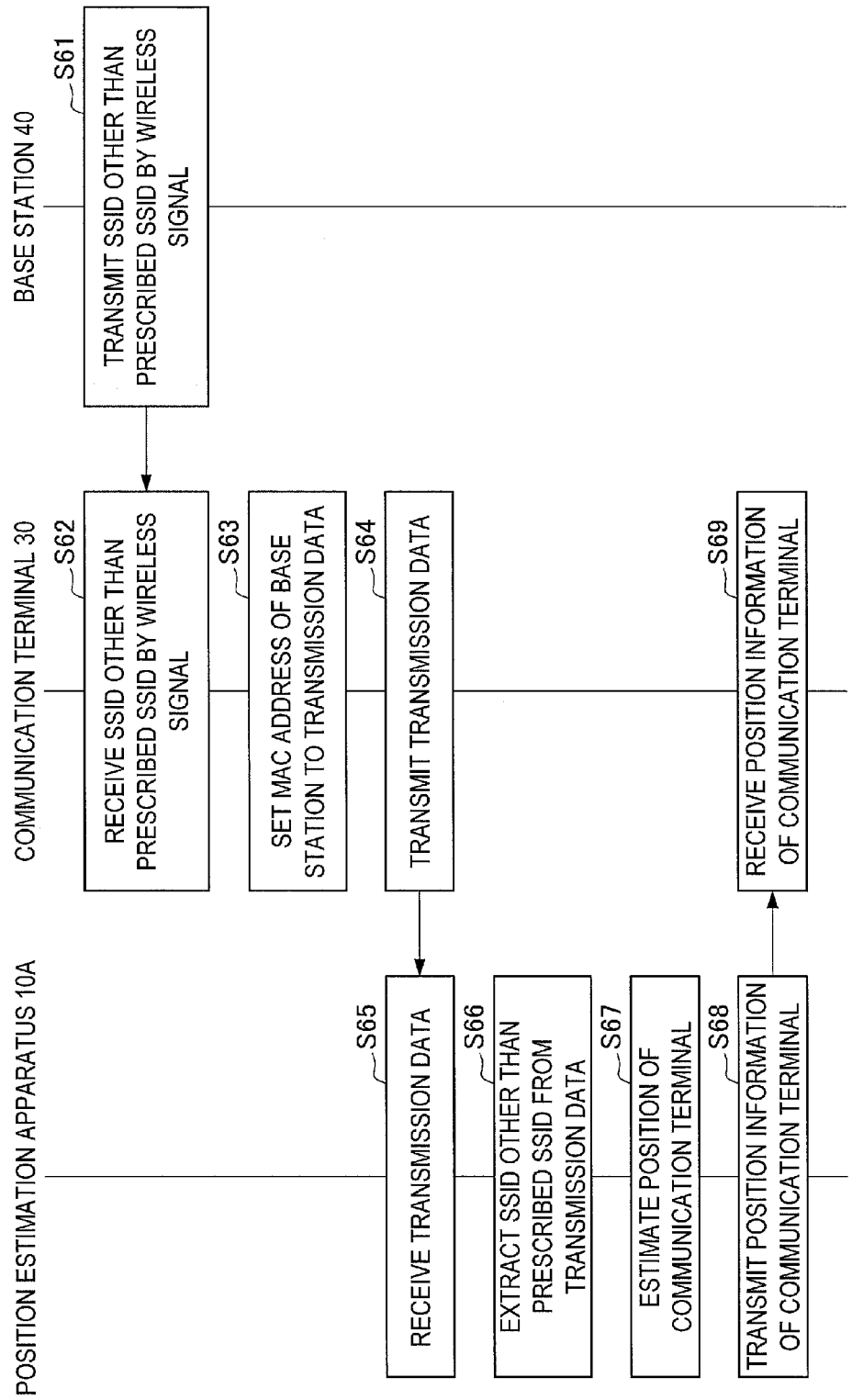
FIG. 10 is a sequence diagram which shows an operation example (the case where the communication terminal receives an SSID other than a prescribed SSID by a wireless signal) of the position estimation system according to the first embodiment of the present disclosure.

To continue, an operation example of the case where the communication terminal 30 receives an SSID other than a prescribed SSID by a wireless signal will be described. FIG. 10 is a sequence diagram which shows an operation example of the position estimation system 1A according to the first embodiment of the present disclosure. In particular, FIG. 10 shows an operation example of the case where the communication terminal 30 receives an SSID other than a prescribed SSID by a wireless signal. Note that, the operation example of the position estimation system 1A is merely an example of an operation of the position estimation system 1A. Therefore, the operation of the position estimation system 1A is not limited to the operation example of the position estimation system 1A shown in FIG. 10.

First, in the base station 40, an SSID other than a prescribed SSID is transmitted by a wireless signal (S61). In the communication terminal 30, the reception control unit 311 performs a control so that the SSID other than the prescribed SSID is received by the wireless signal (S62). That is, the communication unit 340 receives the SSID other than the prescribed SSID by the wireless signal (S62). The transmission control unit 313 sets a MAC address, as identification information of the base station 40 transmitting the wireless signal, to transmission data (S63), and the communication unit 340 transmits the transmission data to the position estimation apparatus 10A (S64).

In the position estimation apparatus 10A, when the transmission data is received by the communication unit 130 (S65), the data acquisition unit 112 extracts the SSID other than the prescribed SSID from the transmission data (S66). When the SSID other than the prescribed SSID is extracted from the transmission data by the data acquisition unit 112, the position estimation unit 113A estimates a position of the communication terminal 30 based on position information of the base station 40 (S67).

To continue, the position estimation unit 113A provides position information of the communication terminal 30 to the communication terminal 30. That is, the communication unit 130 transmits position information of the communication terminal 30 to the communication terminal 30. In the communication terminal 30, when the position information of the communication terminal 30 is received by the communication unit 340, the position information of the communication terminal 30 is acquired.

2. Second Embodiment

Next, a second embodiment of the present disclosure will be described. The second embodiment of the present disclosure will assume the case where a plurality of the communication terminals 30 exist. Note that, in the description of the second embodiment of the present disclosure, a description for the portions which overlap between the first embodiment of the present disclosure and the second embodiment of the present disclosure will be omitted.

[2-1. Configuration Example of the Position Estimation System]

Figure 11:
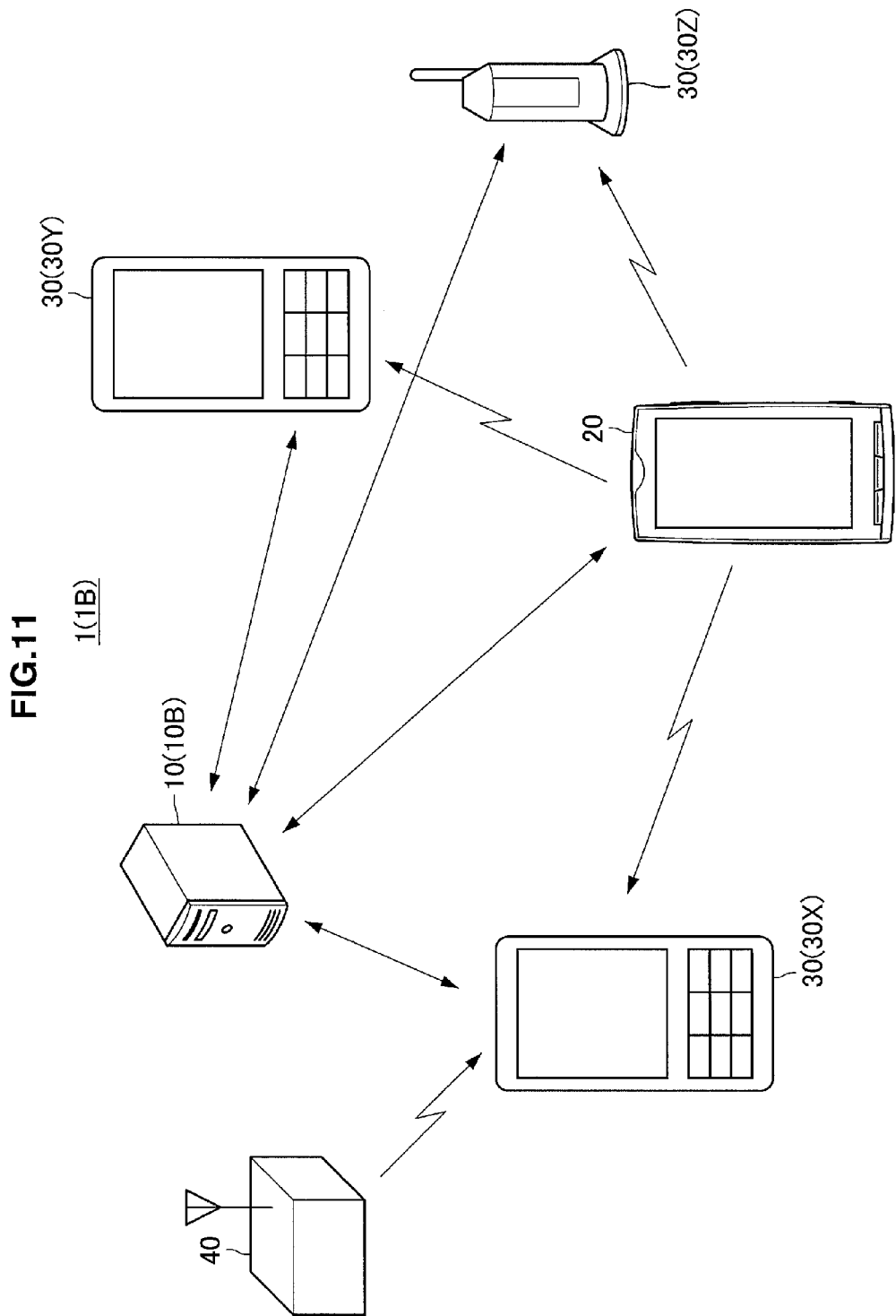
FIG. 11 is a figure which shows a configuration example of a position estimation system according to a second embodiment of the present disclosure.

First, a configuration example of a position estimation system 1B according to the second embodiment of the present disclosure will be described. FIG. 11 is a figure which shows a configuration example of the position estimation system 1B according to the second embodiment of the present disclosure. As shown in FIG. 11, the position estimation system 1B includes a position estimation apparatus 10B, a target terminal 20, and a plurality of communication terminals 30. In the example shown in FIG. 11, while the position estimation system 1B has three communication terminals 30 (communication terminals 30X, 30Y, 30Z), the number of communication terminals 30 of the position estimation system 1B is not particularly limited.

The first embodiment of the present disclosure and the second embodiment of the present disclosure are mainly different for the functions of the position estimation apparatus 10. Therefore, hereinafter, the functions of the position estimation apparatus 10B according to the second embodiment of the present disclosure will mainly be described.

[2-2. Function Configuration Example of the Position Estimation Apparatus]

Figure 12:
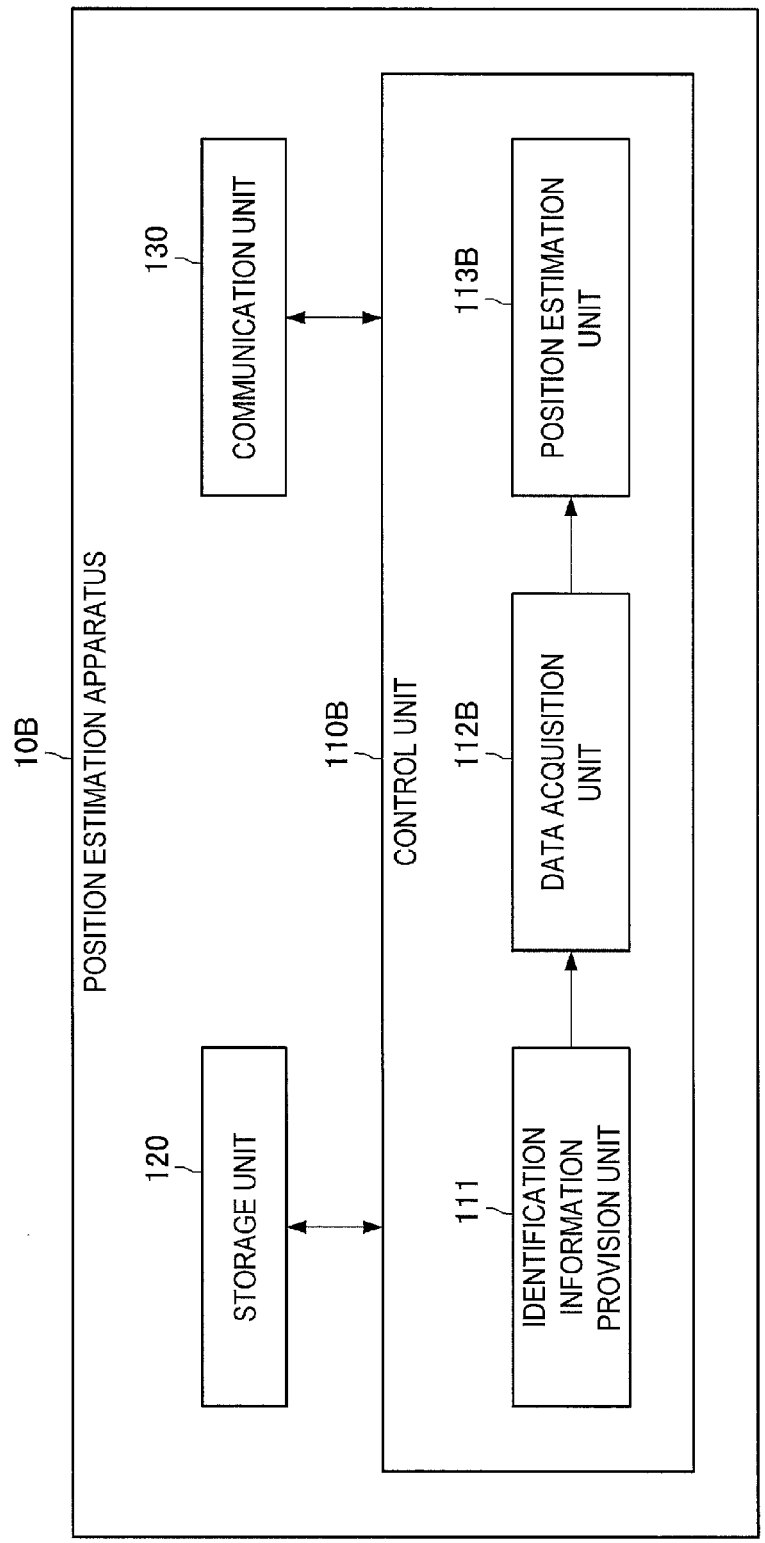
FIG. 12 is a figure which shows a function configuration example of a position estimation apparatus according to the second embodiment of the present disclosure.

To continue, a function configuration example of the position estimation apparatus 10B according to the second embodiment of the present disclosure will be described. FIG. 12 is a figure which shows a function configuration example of the position estimation apparatus 10B according to the second embodiment of the present disclosure. As shown in FIG. 12, the position estimation apparatus 10B according to the second embodiment of the present disclosure includes a control unit 110B, a storage unit 120, and a communication unit 130.

The control unit 110B corresponds to, for example, a processor such as a Central Processing Unit (CPU). The control unit 110B exhibits various functions of the control unit 110B, by executing programs stored in the storage unit 120 or another storage medium. The control unit 110B has an identification information provision unit 111, a data acquisition unit 112B, and a position estimation unit 113B. Here, the functions of the data acquisition unit 112B and the position estimation unit 113B will be described.

The data acquisition unit 112B acquires transmission data transmitted from each of the plurality of communication terminals 30 receiving a wireless signal. In the case where an SSID included in the transmission data transmitted from each of the plurality of communication terminals 30 is a prescribed SSID notified to the communication terminal 30 from the target terminal 20 by a wireless signal, the position estimation unit 113B estimates a position of the target terminal 20 based on position information of each of these plurality of target terminals 20. For example, in the case where the SSID included in the transmission data transmitted from each of the communication terminals 30X, 30Y and 30Z is the prescribed SSID, the position estimation unit 113B can estimate a position of the target terminal 20 based on position information of each of the communication terminals 30X, 30Y and 30Z.

For example, the position estimation unit 113B may estimate a position of the target terminal 20 by the principle of triangulation, based on position information of each of these plurality of communication terminals 30, and a reception strength of a wireless signal in each of the plurality of communication terminals 30. For example, the position estimation unit 113B may estimate a position of the target terminal 20 by the principle of triangulation, based on position information of each of the communication terminals 30X, 30Y and 30Z, and a reception strength of a wireless signal in each of the communication terminals 30X, 30Y and 30Z.

[2-3. Operation Example of the Position Estimation Apparatus]

Figure 13:
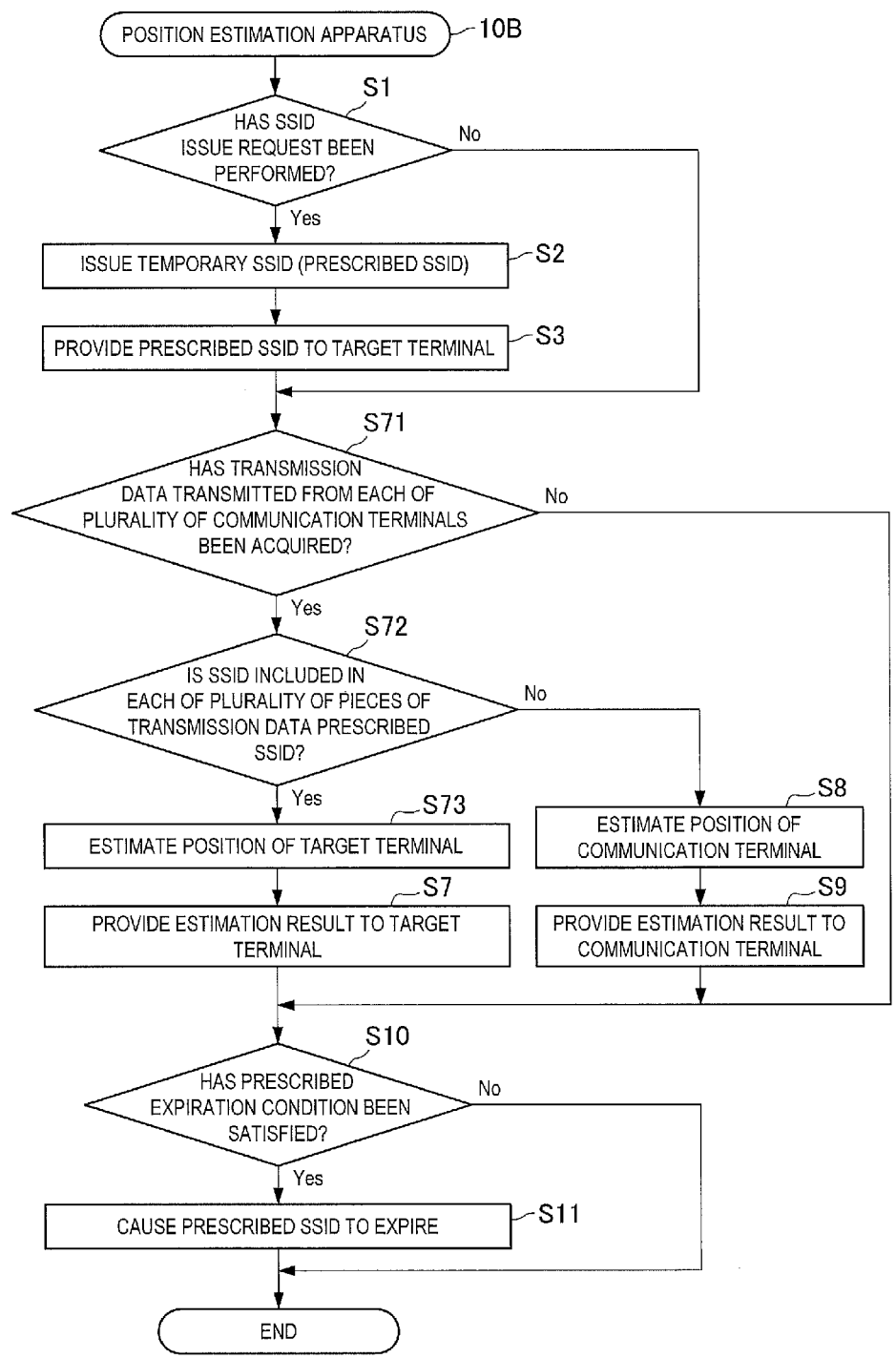
FIG. 13 is a flow chart which shows an operation example of the position estimation apparatus according to the second embodiment of the present disclosure.

To continue, an operation example of the position estimation apparatus 10B according to the second embodiment of the present disclosure will be described. FIG. 13 is a figure which shows an operation example of the position estimation apparatus 10B according to the second embodiment of the present disclosure. Note that, the operation example of the position estimation apparatus 10B shown in FIG. 13 is merely an example of an operation of the position estimation apparatus 10B. Therefore, the operation of the position estimation apparatus 10B is not limited to the operation example of the position estimation apparatus 10B shown in FIG. 13.

As shown in FIG. 3, in the case where a request has been received by the communication unit 130, the identification information provision unit 111 determines whether or not an SSID issue request has been performed from the target terminal 20 (S1). In the case where an SSID issue request has not been performed from the target terminal 20 ("NO" in S1), the identification information provision unit 111 proceeds to S71. On the other hand, in the case where an SSID issue request has been performed from the target terminal 20 ("YES" in S1), the identification information provision unit 111 issues a temporary SSID (prescribed SSID) (S2), and provides the prescribed SSID to the target terminal 20 (S3).

To continue, in the case where transmission data transmitted from each of the plurality of communication terminals 30 has not been acquired by the data acquisition unit 112 ("NO" in S71), the identification information provision unit 111 proceeds to S10. On the other hand, in the case where transmission data transmitted from each of the plurality of communication terminals 30 has been received by the communication unit 130, and has been acquired by the data acquisition unit 112 ("YES" in S71), the position estimation unit 113B proceeds to S72.

To continue, in the case where an SSID included in each of the plurality of pieces of transmission data is the prescribed SSID ("YES" in S72), the position estimation unit 113B estimates a position of the target terminal 20 based on position information of these plurality of communication terminals 30, and provides an estimation result to the target terminal 20 (S7). On the other hand, in the case where an SSID included in the plurality of pieces of transmission data is not the prescribed SSID ("NO" in S72), the position estimation unit 113B performs an operation which estimates a position of the communication terminal 30 based on position information of the base station 40, and an operation which provides an estimation result to the communication terminal 30, for these plurality of communication terminals 30 (S9).

To continue, in the case where a prescribed expiration condition has not been satisfied ("NO" in S10), the identification information provision unit 111 ends the operation, and in the case where a prescribed expiration condition has been satisfied ("YES" in S10), the operation is ended by causing the prescribed SSID to expire (S11). Note that, instead of the operation ending, the operation may return to S1, or another operation may be performed.

[2-4. Operation Example of the Position Estimation System]

Figure 14:
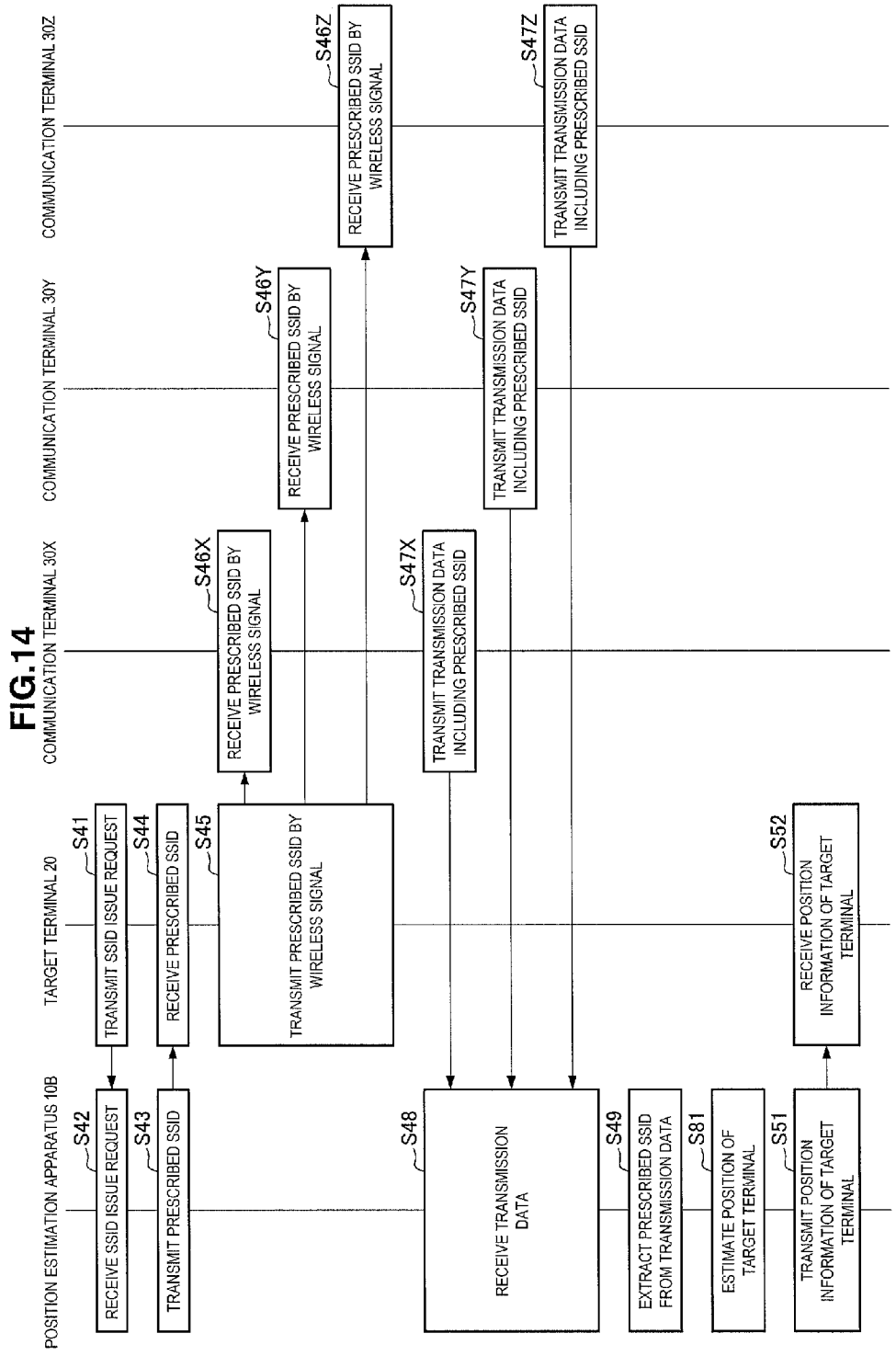
FIG. 14 is a sequence diagram which shows an operation example (the case where the communication terminal receives a prescribed SSID by a wireless signal) of the position estimation system according to the second embodiment of the present disclosure.

To continue, an operation example of the position estimation system 1B according to the second embodiment of the present disclosure will be described. Here, in particular, an operation example of the case where each of the communication terminals 30X, 30Y and 30Z receive a prescribed SSID by a wireless signal will be described. FIG. 14 is a sequence diagram which shows an operation example of the position estimation system 1B according to the second embodiment of the present disclosure. In particular, FIG. 14 shows an operation example of the case where each of the communication terminals 30X, 30Y and 30Z receive a prescribed SSID by a wireless signal. Note that, the operation example of the position estimation system 1B shown in FIG. 14 is merely an example of an operation of the position estimation system 1B. Therefore, the operation of the position estimation system 1B is not limited to the operation example of the position estimation system 1B shown in FIG. 14.

First, in the target terminal 20, the identification information acquisition unit 211 provides an SSID issue request. That is, the communication unit 240 transmits an SSID issue request to the position estimation apparatus 10B (S41). In the position estimation apparatus 10B, when the SSID issue request is received by the communication unit 130 (S42), the identification information provision unit 111 issues a prescribed SSID, and provides the issued prescribed SSID. That is, the communication unit 130 transmits the issued prescribed SSID to the target terminal 20 (S43). In the target terminal 20, when the prescribed SSID is received by the communication unit 240, the prescribed SSID is acquired by the identification information acquisition unit 211.

To continue, in the target terminal 20, when the transmission control unit 212 performs a control so that the prescribed SSID is transmitted by a wireless signal, the communication unit 240 transmits the prescribed SSID to each of the communication terminals 30X, 30Y and 30Z by a wireless signal (S45). In each of the communication terminals 30X, 30Y and 30Z, when the communication unit 340 receives the prescribed SSID transmitted by the wireless signal (S46X, S46Y, S46Z), the prescribed SSID is acquired from the wireless signal by the reception control unit 311.

In each of the communication terminals 30X, 30Y and 30Z, after the prescribed SSID has been included in transmission data by the transmission control unit 313, a control is performed so that the transmission data including the prescribed SSID is transmitted to the position estimation apparatus 10B by the transmission control unit 313. In each of the communication terminals 30X, 30Y and 30Z, the transmission data including the prescribed SSID is transmitted to the position estimation apparatus 10B by the communication unit 340 (S47X, S47Y, S47Z).

In the position estimation apparatus 10B, when the transmission data transmitted from each of the communication terminals 30X, 30Y and 30Z is received by the communication unit 130 (S48), the data acquisition unit 112 extracts the prescribed SSID from each of the transmission data (S49). When the prescribed SSID is extracted from each of the transmission data by the data acquisition unit 112, the position estimation unit 113B estimates a position of the target terminal 20 based on position information of each of the communication terminals 30X, 30Y and 30Z (S50).

To continue, the position estimation unit 113B provides position information of the target terminal 20 to the target terminal 20. That is, the communication unit 130 transmits position information of the target terminal 20 to the target terminal 20. In the target terminal 20, when the position information of the target terminal 20 is received by the communication unit 240, the position information of the target terminal 20 is acquired.

3. Hardware Configuration Examples

Figure 15:
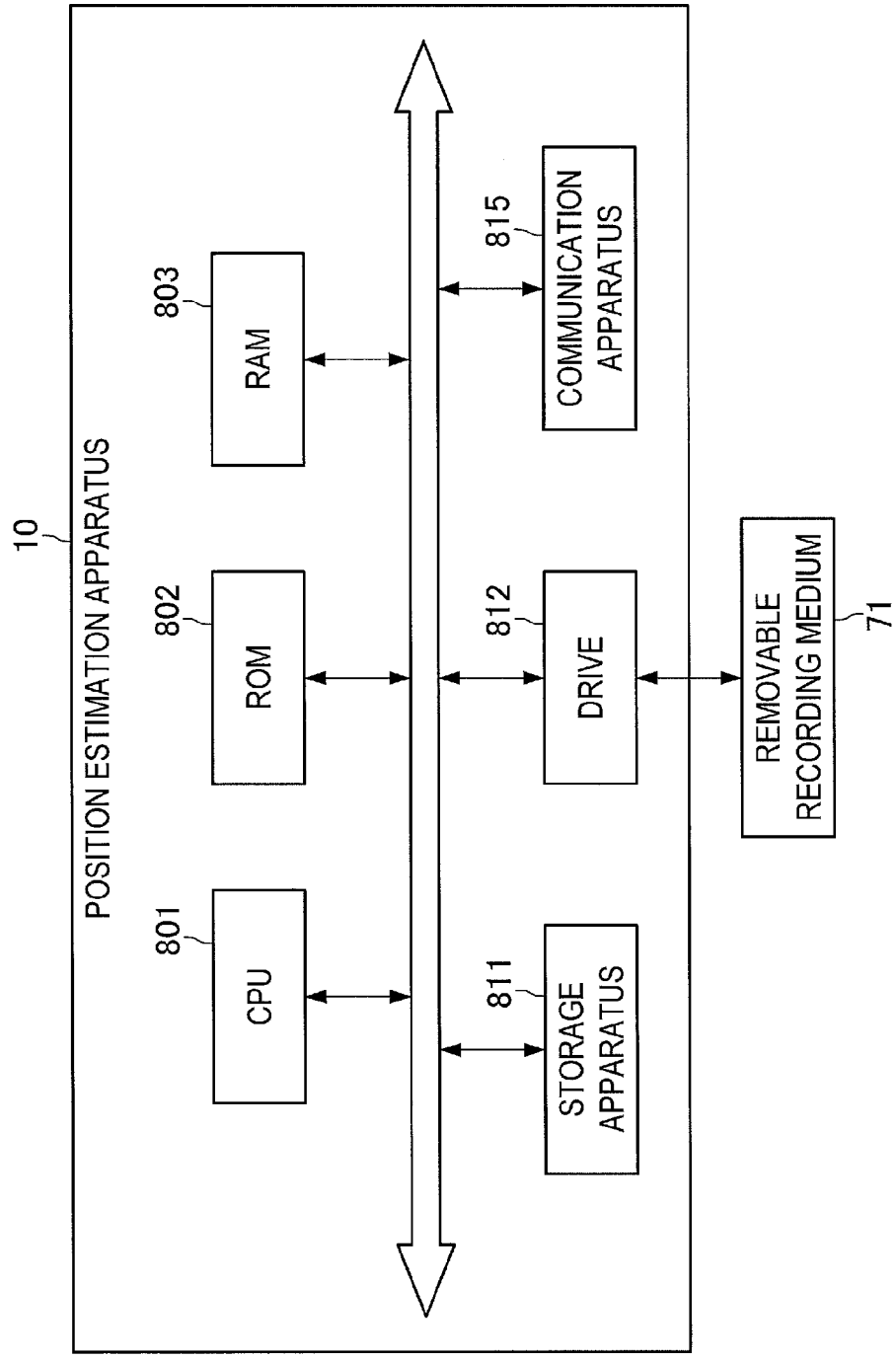
FIG. 15 is a figure which shows a hardware configuration example of the position estimation apparatus.

To continue, a hardware configuration example of the position estimation apparatus 10 according to an embodiment of the present disclosure will be described. FIG. 15 is a figure which shows a hardware configuration example of the position estimation apparatus 10 according to an embodiment of the present disclosure. However, the hardware configuration example shown in FIG. 15 merely shows an example of the hardware configuration of the position estimation apparatus 10. Therefore, the hardware configuration of the position estimation apparatus 10 is not limited to the example shown in FIG. 15.

As shown in FIG. 15, the position estimation apparatus 10 includes a CPU (Central Processing Unit) 801, a ROM (Read Only Memory) 802, a RAM (Random Access Memory) 803, a storage apparatus 811, a drive 812, and a communication apparatus 815.

The CPU 801 functions as an operation processing apparatus and a control apparatus, and controls all the operations within the position estimation apparatus 10 in accordance with various programs. Further, the CPU 801 may be a microprocessor. The ROM 802 stores programs and operation parameters used by the CPU 801. The RAM 803 temporarily stores programs used in the execution of the CPU 801, and parameters which arbitrarily change in this execution. These sections are mutually connected by a host bus constituted from a CPU bus or the like.

The storage apparatus 811 is an apparatus for data storage constituted as an example of a storage unit 120 of the position estimation apparatus 10. The storage apparatus 811 may include a storage medium, a recording apparatus which records data to the storage medium, a reading apparatus which reads data from the storage medium, and an erasure apparatus which erases data recorded in the storage medium. This storage apparatus 811 stores programs executed by the CPU 801 and various data.

The drive 812 is a reader/writer for the storage medium, and is built into the position estimation apparatus 10 or is externally attached. The drive 812 reads information recorded on a removable storage medium 71, such as a mounted magnetic disk, an optical disk, a magneto-optical disk, or a semiconductor memory, and outputs the information to the RAM 803. Further, the drive 812 can write information to the removable storage medium 71.

The communication apparatus 815 is, for example, a communication interface constituted by a communication device or the like for connecting to a network. Further, even if the communication apparatus 815 is a communication apparatus adaptive to wireless LAN (Local Area Network) or LTE (Long Term Evolution), the communication apparatus 815 may be a wired communication apparatus which communicates by wires. For example, it is possible for the communication apparatus 815 to communicate with other apparatuses via a network.

Figure 16:
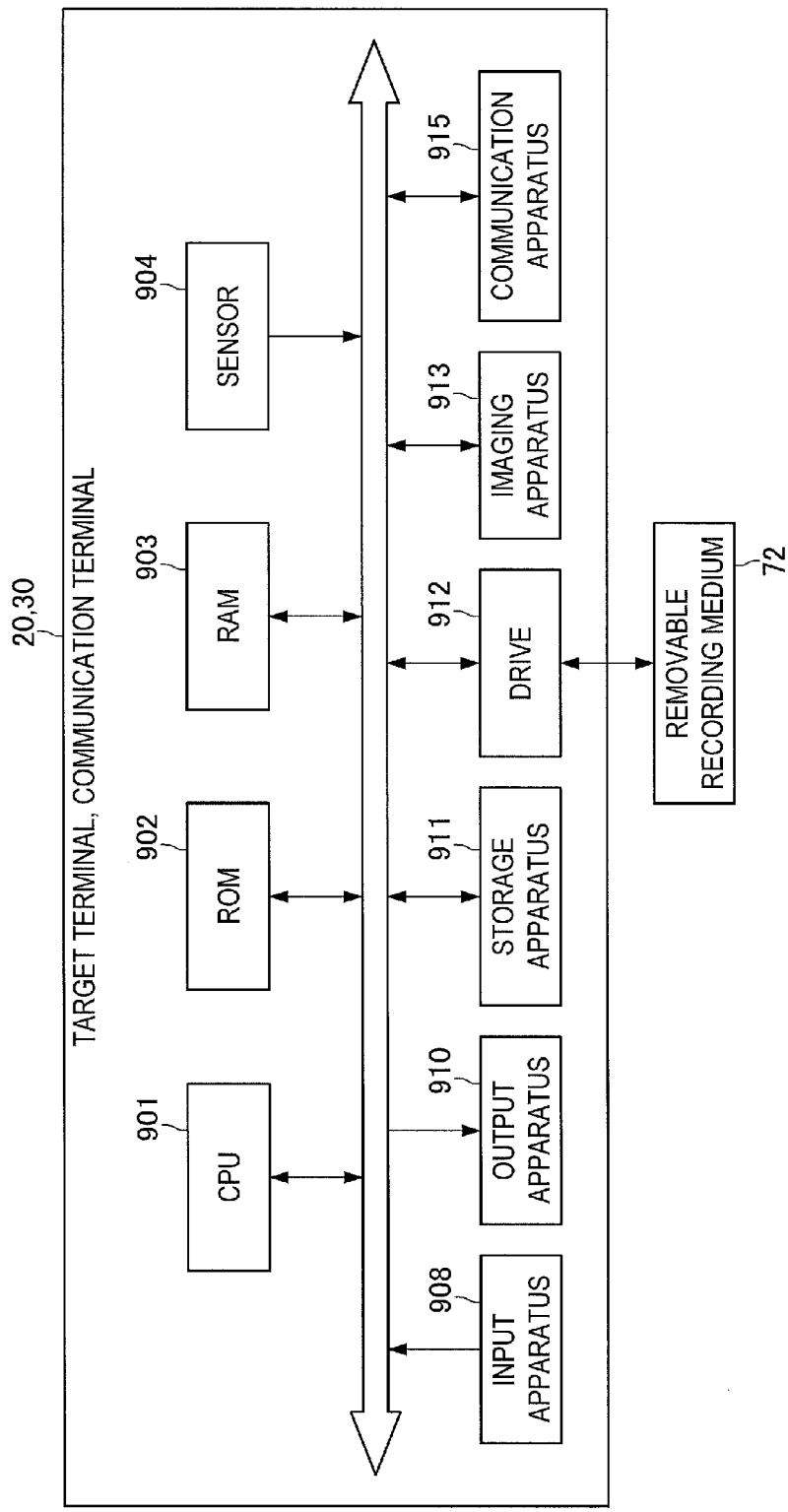
FIG. 16 is a figure which shows a hardware configuration example of the target terminal and the communication terminal.

To continue, a hardware configuration example of the target terminal 20 and the communication terminal 30 according to an embodiment of the present disclosure will be described. FIG. 16 is a figure which shows a hardware configuration example of the target terminal 20 and the communication terminal 30 according to an embodiment of the present disclosure. However, the hardware configuration example shown in FIG. 16 merely shows an example of the hardware configuration of the target terminal 20 and the communication terminal 30. Therefore, the hardware configuration of the target terminal 20 and the communication terminal 30 is not limited to the example shown in FIG. 16. Hereinafter, as a representative for the target terminal 20 and the communication terminal 30, the hardware configuration example of the target terminal 20 will mainly be explained.

As shown in FIG. 16, the target terminal 20 includes a CPU (Central Processing Unit) 901, a ROM (Read Only Memory) 902, a RAM (Random Access Memory) 903, a sensor 904, an input apparatus 908, an output apparatus 910, a storage apparatus 911, a drive 912, an imaging apparatus 913, and a communication apparatus 915.

The CPU 901 functions as an operation processing apparatus and a control apparatus, and controls all the operations within the target terminal 20 in accordance with various programs. Further, the CPU 901 may be a microprocessor. The ROM 902 stores programs and operation parameters used by the CPU 901. The RAM 903 temporarily stores programs used in the execution of the CPU 901, and parameters which arbitrary change in this execution. These sections are mutually connected by a host bus constituted from a CPU bus or the like.

The sensor 904 is constituted from various types of detection sensors and their peripheral circuits, such as a terminal state detection sensor for detecting a state of the target terminal 20. As an example, a position detection sensor (for example, a Global Positioning System (GPS) sensor), an inclination sensor, an acceleration sensor, a direction sensor, a temperature sensor, a humidity sensor, an illuminance sensor or the like can be included as the sensor 904. A detection signal by the sensor 904 is sent to the CPU 901. In this way, the CPU 901 can know the state of the target terminal 20 (for example, the position, inclination, acceleration, direction, temperature, humidity, illuminance or the like).

The input apparatus 908 includes an input unit, such as a mouse, a keyboard, a touch panel, buttons, a microphone, switches or leavers, for a user to input information, and an input control circuit which generates an input signal based on an input by the user, and outputs the input signal to the CPU 901. By operating the input apparatus 908, it is possible for the user of the target terminal 20 to input various data for the target terminal 20 and to instruct the process operations.

The output apparatus 910 includes functions to output various kinds of information. The output apparatus 910 includes, for example, a display device such as a liquid crystal display (LCD) apparatus, an OLED (Organic Light Emitting Diode) apparatus, or a lamp. In addition, the output apparatus 910 includes a sound output apparatus such as a speaker or headphones. For example, the display device displays an imaged image or a generated image. On the other hand, the sound output apparatus converts sound data and outputs sounds.

The storage apparatus 911 is an apparatus for data storage constituted as an example of a storage unit 230 of the target terminal 20. The storage apparatus 911 may include a storage medium, a recording apparatus which records data to the storage medium, a reading apparatus which reads data from the storage medium, and an erasure apparatus which erases data recorded in the storage medium. This storage apparatus 911 stores programs executed by the CPU 901 and various data.

The drive 912 is a reader/writer for the storage medium, and is built into the target terminal 20 or is externally attached. The drive 912 reads information recorded on a removable storage medium 72, such as a mounted magnetic disk, an optical disk, a magneto-optical disk, or a semiconductor memory, and outputs the information to the RAM 903. Further, the drive 912 can write information to the removable storage medium 72.

The imaging apparatus 913 includes an imaging optical system such as an imaging lens which collects light and a zoom lens, and a signal conversion element such as a Charge Coupled Device (CCD) or a Complementary Metal Oxide Semiconductor (CMOS). The imaging optical system collects light originating from a photographic subject and forms an image of the photographic subject in a signal conversion unit, and the signal conversion element converts the formed image of the photographic subject into an electrical image signal.

The communication apparatus 915 is, for example, a communication interface constituted by a communication device or the like for connecting to a network. Further, even if the communication apparatus 915 is a communication apparatus adaptive to wireless LAN (Local Area Network) or LTE (Long Term Evolution), the communication apparatus 915 may be a wired communication apparatus which communicates by wires. For example, it is possible for the communication apparatus 915 to communicate with other apparatuses via a network.

4. Conclusion

As described above, according to an embodiment of the present disclosure, a position estimation apparatus 10A is provided, including an identification information provision unit 111 which provides temporarily issued prescribed identification information to a target terminal, a data acquisition unit 112A which acquires transmission data transmitted from a communication terminal 30 receiving a wireless signal, and a position estimation unit 113A which estimates a position of a target terminal 20, in the case where identification information included in the transmission data is the prescribed identification information notified to the communication terminal 30 from the target terminal 20 by the wireless signal, based on position information of the communication terminal 30.

According to such a configuration, since temporarily issued prescribed identification information is used, it becomes possible to reduce the possibility that information related to a user of the target terminal 20 is acquired by another person, when estimating a position of the target terminal 20.

It should be understood by those skilled in the art that various modifications, combinations, sub-combinations and alterations may occur depending on design requirements and other factors insofar as they are within the scope of the appended claims or the equivalents thereof.

Further, a program for causing hardware, such as a CPU, ROM and RAM built into a computer, to exhibit functions similar to the configuration included in the above described position estimation apparatus 10 can be created. Further, a recording medium can also be provided which records these programs and is capable of performing reading to the computer.

Further, a program for causing hardware, such as a CPU, ROM and RAM built into a computer, to exhibit functions similar to the configuration included in the above described target terminal 20 can be created. Further, a recording medium can also be provided which records these programs and is capable of performing reading to the computer.

Further, a program for causing hardware, such as a CPU, ROM and RAM built into a computer, to exhibit functions similar to the configuration included in the above described communication terminal 30 can be created. Further, a recording medium can also be provided which records these programs and is capable of performing reading to the computer.

Additionally, the present technology may also be configured as below.

(1)
A position estimation apparatus including:
an identification information provision unit which provides temporarily issued prescribed identification information to a target terminal;
a data acquisition unit which acquires transmission data transmitted from a communication terminal receiving a wireless signal; and
a position estimation unit which estimates a position of the target terminal, in the case where identification information included in the transmission data is the prescribed identification information notified to the communication terminal from the target terminal by the wireless signal, based on position information of the communication terminal.

(2)
The position estimation apparatus according to (1),
wherein, in the case where an issue of identification information has been requested from the target terminal, the identification information provision unit issues the prescribed identification information to be provided to the target terminal.

(3)
The position estimation apparatus according to (1) or (2),
wherein the identification information is a Service Set Identifier (SSID).

(4)
The position estimation apparatus according to any one of (1) to (3),
wherein, in the case where a prescribed expiration condition has been satisfied after issuing the prescribed identification information, the identification information provision unit causes the prescribed identification information to expire.

(5)
The position estimation apparatus according to (4),
wherein the prescribed expiration condition is a condition where a prescribed time has lapsed after issuing the prescribed identification information.

(6)
The position estimation apparatus according to (4),
wherein the prescribed expiration condition is a condition where the position of the target terminal has deviated from a prescribed region.

(7)
The position estimation apparatus according to (4),
wherein the prescribed expiration condition is a condition where an execution of an application using the position of the target terminal has ended.

(8)
The position estimation apparatus according to (4),
wherein the prescribed expiration condition is a condition where a prescribed operation from a user has been input for the target terminal.

(9)
The position estimation apparatus according to any one of (1) to (8),
wherein, in the case where a reception strength of the wireless signal in the communication terminal is included in the transmission data, the position estimation unit estimates the position of the target terminal based on the reception strength and position information of the communication terminal.

(10)
The position estimation apparatus according to any one of (1) to (9),
wherein, in the case where identification information included in the transmission data is other than the prescribed identification information, the position estimation unit estimates a position of the communication terminal based on position information of a base station transmitting the wireless signal.

(11)
A position estimation method including:
providing temporarily issued prescribed identification information to a target terminal;
acquiring transmission data transmitted from a communication terminal receiving a wireless signal; and
estimating a position of the target terminal, in the case where identification information included in the transmission data is the prescribed identification information notified to the communication terminal from the target terminal by the wireless signal, based on position information of the communication terminal.

(12)
A computer-readable recording medium having a program recorded thereon, the program for causing a computer to function as a position estimation apparatus including:

an identification information provision unit which provides temporarily issued prescribed identification information to a target terminal;

a data acquisition unit which acquires transmission data transmitted from a communication terminal receiving a wireless signal; and a position estimation unit which estimates a position of the target terminal, in the case where identification information included in the transmission data is the prescribed identification information notified to the communication terminal from the target terminal by the wireless signal, based on position information of the communication terminal.

(13)

A target terminal capable of communicating with a position estimation apparatus which performs a position estimation of a target terminal by receiving transmission data including temporarily issued prescribed identification information from a communication terminal, the target terminal including:

an identification information acquisition unit which acquires temporarily issued prescribed identification information from a position estimation apparatus; and a transmission control unit which performs a control in a manner that the prescribed identification information is notified to a communication terminal by a wireless signal.

(14)

The target terminal according to (13), wherein, in the case where identification information included in transmission data transmitted to the position estimation apparatus from the communication terminal is the prescribed identification information, a position of the target terminal is estimated by the position estimation apparatus based on position information of the communication terminal.

(15)

A communication method of a target terminal capable of communicating with a position estimation apparatus which performs a position estimation of a target terminal by receiving transmission data including temporarily issued prescribed identification information from a communication terminal, the communication method including:

acquiring temporarily issued prescribed identification information from a position estimation apparatus; and performing a control in a manner that the prescribed identification information is notified to a communication terminal by a wireless signal.

(16)

A computer-readable recording medium having a program recorded thereon, the program for causing a computer to function as a target terminal capable of communicating with a position estimation apparatus which performs a position estimation of a target terminal by receiving transmission data including temporarily issued prescribed identification information from a communication terminal, the target terminal including:

an identification information acquisition unit which acquires temporarily issued prescribed identification information from a position estimation apparatus; and a transmission control unit which performs a control in a manner that the prescribed identification information is notified to a communication terminal by a wireless signal.

(17)

A communication terminal including:

a reception control unit which performs a control in a manner that a wireless signal is received; and a transmission control unit which performs a control, in the case where temporarily issued prescribed identification information has been notified from a target terminal by the wireless signal, in a manner that transmission data including the prescribed identification information as identification information is transmitted to a position estimation apparatus.

(18)

The communication terminal according to (17), wherein, in the case where identification information notified by the wireless signal satisfies a prescribed condition, the transmission control unit determines that the prescribed identification information has been notified by the wireless signal from the target terminal.

(19)

The communication terminal according to (18), wherein the prescribed condition is a condition where identification information notified by the wireless signal includes a prescribed character string decided in advance.

(20)

The communication terminal according to (18), wherein the prescribed condition is a condition where identification information notified by the wireless signal is included in a list of temporarily issued prescribed identification information provided from the position estimation apparatus.

(21)

The communication terminal according to any one of (17) to (20), wherein, in the case where identification information notified by the wireless signal is other than the prescribed identification information, the transmission control unit performs a control in a manner that transmission data including an identifier of a base station transmitting the wireless signal is transmitted to the position estimation apparatus.

(22)

The communication terminal according to (21), wherein, in the case where the prescribed identification information has been notified from the target terminal by one wireless signal, and in the case where identification information notified by another wireless signal is other than the prescribed identification information, the transmission control unit performs a control in a manner that transmission data including an identifier of a base station transmitting the another wireless signal and not including an identifier of the target terminal is transmitted to the position estimation apparatus.

(23)

The communication terminal according to (21), wherein the identifier of the base station is a Media Access Control (MAC) address of the base station.

(24)

The communication terminal according to any one of (17) to (23), wherein, in the case where identification information notified by the wireless signal is the prescribed identification information, the transmission control unit performs a control in a manner that transmission data including a reception strength of the wireless signal and the prescribed identification information is transmitted to the position estimation apparatus.

(25)

The communication terminal according to any one of (17) to (24), wherein, in the case where identification information notified by the wireless signal is the prescribed identification information, the transmission control unit performs a control in a manner that transmission data including position information of the communication terminal and the prescribed identification information is transmitted to the position estimation apparatus.

(26)

The communication terminal according to any one of (17) to (25), further including:

a position measurement control unit which performs a control, in the case where identification information notified by the wireless signal is the prescribed identification information, in a manner that a position measurement interval of the communication terminal is shortened.

(27)

The communication terminal according to any one of (17) to (26), wherein, in the case where identification information notified by the wireless signal is the prescribed identification information, a position of the target terminal is estimated by the position estimation apparatus based on position information of the communication terminal.

(28)

A communication method including:

performing a control in a manner that a wireless signal is received; and performing a control, in the case where temporarily issued prescribed identification information has been notified from a target terminal by the wireless signal, in a manner that transmission data including the prescribed identification information is transmitted to a position estimation apparatus.

(29)

A computer-readable recording medium having a program recorded thereon, the program for causing a computer to function as a communication terminal including:

a reception control unit which performs a control in a manner that a wireless signal is received; and a transmission control unit which performs a control, in the case where temporarily issued prescribed identification information has been notified from a target terminal by the wireless signal, in a manner that transmission data including the prescribed identification information is transmitted to a position estimation apparatus.

(30)

A position estimation system including:

a position estimation apparatus;

a target terminal; and a communication terminal, wherein the position estimation apparatus has an identification information provision unit which provides temporarily issued prescribed identification information to a target terminal, a data acquisition unit which acquires transmission data transmitted from a communication terminal receiving a wireless signal, and a position estimation unit which estimates a position of the target terminal, in the case where identification information included in the transmission data is the prescribed identification information notified to the communication terminal from the target terminal by the wireless signal, based on position information of the communication terminal, wherein the target terminal has an identification information acquisition unit which acquires the prescribed identification information from the position estimation apparatus, and a transmission control unit which performs a control in a manner that the prescribed identification information is notified to the communication terminal by the wireless signal, and wherein the communication terminal has a reception control unit which performs a control in a manner that the wireless signal is received, and a transmission control unit which performs a control, in the case where the prescribed identification information has been notified from the target terminal by the wireless signal, in a manner that transmission data including the prescribed identification information as identification information is transmitted to the position estimation apparatus.

REFERENCE SIGNS LIST 1 (1A, 1B) position estimation system
10 (10A, 10B) position estimation apparatus target terminal
30 (30X, 30Y, 30Z) communication terminal base station
110 (110A, 110B) control unit
111 identification information provision unit
112 (112A, 112B) data acquisition unit
113 (113A, 113B) position estimation unit
120 storage unit
130 communication unit
210 control unit
211 identification information acquisition unit
212 transmission control unit
220 input unit
230 storage unit
240 communication unit
250 output unit
310 control unit
311 reception control unit
312 position measurement control unit
313 transmission control unit
320 input unit
330 storage unit
340 communication unit
350 output unit

The invention claimed is:

1. A position estimation apparatus comprising:
   identification information provision circuitry which provides temporarily issued prescribed identification information to a target terminal;
   a receiver configured to acquire transmission data transmitted from a communication terminal receiving a wireless signal; and
   position estimation circuitry configured to
   extract identification information from the transmission data,
   estimate a position of the target terminal in response to determining that the identification information includes prescribed identification information,
   transmit the estimated position to the target terminal,
   estimate a position of the communication terminal based on position information of a base station in response to determining that the identification information does not include prescribed identification information, and
   provide the estimated position of the communication terminal to the communication terminal.

2. The position estimation apparatus according to claim 1, wherein, in the case where an issue of identification information has been requested from the target terminal, the identification information provision circuitry issues the prescribed identification information to be provided to the target terminal.

3. The position estimation apparatus according to claim 1, wherein the identification information is a Service Set Identifier (SSID).

4. The position estimation apparatus according to claim 1, wherein, in the case where a prescribed expiration condition has been satisfied after issuing the prescribed identification information, the identification information provision circuitry causes the prescribed identification information to expire.

5. The position estimation apparatus according to claim 4, wherein the prescribed expiration condition is a condition where a prescribed time has lapsed after issuing the prescribed identification information.

6. The position estimation apparatus according to claim 4, wherein the prescribed expiration condition is a condition where the position of the target terminal has deviated from a prescribed region.

7. The position estimation apparatus according to claim 4, wherein the prescribed expiration condition is a condition where an execution of an application using the position of the target terminal has ended.

8. The position estimation apparatus according to claim 4, wherein the prescribed expiration condition is a condition where a prescribed operation from a user has been input for the target terminal.

9. The position estimation apparatus according to claim 1, wherein, in the case where a reception strength of the wireless signal in the communication terminal is included in the transmission data, the position estimation circuitry estimates the position of the target terminal based on the reception strength and position information of the communication terminal.

10. The position estimation apparatus according to claim 1, wherein the position of the target terminal is estimated based on the position information of the communication device.

11. The position estimation apparatus according to claim 10, wherein the position estimation circuitry is further configured to:
retrieve from a memory of the apparatus the position of the communication device when the communication device is fixed; and
retrieve from the transmission data the position of the communication device when the communication device is mobile.

12. The position estimation apparatus according to claim 1, wherein the temporarily issued prescribed identification information includes a prescribed character string in a predetermined position.

13. The position estimation apparatus according to claim 1, wherein the position estimation circuitry is further configured to:
provide a list of prescribed identification information to the communication terminal.

14. A position estimation method comprising:
providing temporarily issued prescribed identification information to a target terminal;
acquiring transmission data transmitted from a communication terminal receiving a wireless signal;
extracting identification information from the transmission data;
estimating a position of the target terminal in response to determining that the identification information includes prescribed identification information;
transmitting the estimated position to the target terminal;
estimating a position of the communication terminal based on position information of a base station in response to determining that the identification information does not include prescribed identification information; and
providing the estimated position of the communication terminal to the communication terminal.

15. A non-transitory computer-readable recording medium having a program recorded thereon, the program for causing a computer to:
provide temporarily issued prescribed identification information to a target terminal;
acquire transmission data transmitted from a communication terminal receiving a wireless signal;
extract identification information from the transmission data;
estimate a position of the target terminal in response to determining that the identification information includes prescribed identification information;
transmit the estimated position to the target terminal;
estimate a position of the communication terminal based on position information of a base station in response to determining that the identification information does not include prescribed identification information; and
provide the estimated position of the communication terminal to the communication terminal.

16. A target terminal capable of communicating with a position estimation apparatus which performs a position estimation of a target terminal by receiving transmission data including temporarily issued prescribed identification information from a communication terminal, the target terminal comprising:
a receiver configured to acquire temporarily issued prescribed identification information from the position estimation apparatus, and receive an estimated position of the target terminal from the position estimation apparatus when identification information extracted by the position estimation apparatus from transmission data includes the prescribed identification information wherein an estimate of a position of the communication terminal is determined based on position information of a base station by the position estimation apparatus when the identification information does not include prescribed identification information; and
a transmitter configured to transmit the prescribed identification information to the communication terminal by a wireless signal.

17. A communication method of a target terminal capable of communicating with a position estimation apparatus which performs a position estimation of a target terminal by receiving transmission data including temporarily issued prescribed identification information from a communication terminal, the communication method comprising:
acquiring temporarily issued prescribed identification information from the position estimation apparatus;
performing a control in a manner that the prescribed identification information is notified to a communication terminal by a wireless signal; and
receiving an estimated position of the target terminal from the position estimation apparatus when identification information extracted by the position estimation apparatus from transmission data transmitted by the communication terminal includes the prescribed identification information wherein an estimate of a position of the communication terminal is determined based on position information of a base station by the position estimation apparatus when the identification information does not include prescribed identification information.

18. A non-transitory computer-readable recording medium having a program recorded thereon, the program for causing a computer to:

acquire temporarily issued prescribed identification information from a position estimation apparatus;
transmit the prescribed identification to a communication terminal by a wireless signal; and
receive an estimated position of the target terminal from the position estimation apparatus when identification information extracted by the position estimation apparatus from transmission data by the communication terminal includes the prescribed identification information wherein an estimate of a position of the communication terminal is determined based on position information of a base station by the position estimation apparatus when the identification does not include prescribed identification information.

19. A position estimation system comprising:
a position estimation apparatus;
a target terminal; and
a communication terminal,
wherein the position estimation apparatus includes
identification information provision circuitry which provides temporarily issued prescribed identification information to a target terminal,
a receiver which acquires transmission data transmitted from a communication terminal receiving a wireless signal, and
position estimation circuitry configured to extract identification information from the transmission data,
estimate a position of the target terminal in response to determining that the identification information includes prescribed identification information,
transmit the estimated position to the target terminal,
estimate a position of the communication terminal based on position information of a base station in response to determining that the identification information does not include prescribed identification information, and
provide the estimated position of the communication terminal to the communication terminal,
wherein the target terminal has
a receiver which acquires the prescribed identification information from the position estimation apparatus, and
a transmitter configured to transmit the prescribed identification information to the communication terminal by the wireless signal, and
wherein the communication terminal has
a receiver configured to receive the wireless signal, and
a transmitter configured to transmit, in the case where the prescribed identification information has been notified from the target terminal by the wireless signal, transmission data including the prescribed identification information as identification information to the position estimation apparatus.

* * * * *